(12) United States Patent
Shimada et al.

(10) Patent No.: US 9,191,676 B2
(45) Date of Patent: Nov. 17, 2015

(54) VIDEO DECODING APPARATUS AND METHOD

(75) Inventors: Satoshi Shimada, Kawasaki (JP); Kimihiko Kazui, Kawasaki (JP); Junpei Koyama, Shibuya (JP); Akira Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 382 days.

(21) Appl. No.: 13/611,742

(22) Filed: Sep. 12, 2012

(65) Prior Publication Data

US 2013/0107958 A1 May 2, 2013

(30) Foreign Application Priority Data

Oct. 31, 2011 (JP) ................................ 2011-239650

(51) Int. Cl.
*H04N 7/12* (2006.01)
*H04N 11/02* (2006.01)
(Continued)

(52) U.S. Cl.
CPC ............. *H04N 19/198* (2014.11); *H04N 19/51* (2014.11); *H04N 19/52* (2014.11); *H04N 19/593* (2014.11)

(58) Field of Classification Search
CPC .................. H04N 19/00381; H04N 19/00763; H04N 19/00733; H04N 19/00696
USPC ..................................................... 375/240.15
See application file for complete search history.

(56) References Cited

U.S. PATENT DOCUMENTS

| 2004/0264573 | A1  | 12/2004 | Bossen |
| 2012/0269271 | A1* | 10/2012 | Chen et al. ............... 375/240.16 |
| 2013/0022119 | A1* | 1/2013  | Chien et al. ............. 375/240.16 |

FOREIGN PATENT DOCUMENTS

| JP | 2004-72712 A  | 3/2004 |
| JP | 2004-120138 A | 4/2004 |
| JP | 2007-525100 A | 8/2007 |

OTHER PUBLICATIONS

ISO/IEC 14496-10 (MPEG-4 Part 10)/ITU-T Rec. H.264 International Telecommunication Union ITU-T H.264 (Mar. 2010)Telecommunication Standardization Sector of ITU, Series H: Audiovisual and Multimedia Systems Infrastructure of audiovisual services—Coding of moving video—Advanced video coding for generic audiovisual services. See Chapters 8.4.1.2.1 and 8.4.1.2.3, pp. I-III and 154-160.
(Continued)

*Primary Examiner* — Hee-Yong Kim
(74) *Attorney, Agent, or Firm* — Fujitsu Patent Center

(57) ABSTRACT

A video decoding apparatus according to one aspect of the disclosure performs a decoding process, on a process block basis, using a motion vector of the process block and prediction information candidates of the motion vector. The video decoding apparatus includes a first prediction information candidate generating part configured to acquire the prediction information of the adjacent block to generate the prediction information candidate if motion compensation of the block is performed using the same prediction information as the prediction information of the adjacent block; and a second prediction information candidate generating part configured to add prediction information to the prediction information candidates if the number of the prediction information candidates is less than a predetermined number and two prediction information items of the prediction information candidates have the reference picture identifiers indicating the same picture, the added prediction information including an averaged motion vector of two motion vectors.

8 Claims, 19 Drawing Sheets

(51) Int. Cl.
  *H04N 11/04* (2006.01)
  *H04N 19/196* (2014.01)
  *H04N 19/52* (2014.01)
  *H04N 19/51* (2014.01)
  *H04N 19/593* (2014.01)

(56) References Cited

OTHER PUBLICATIONS

Benjamin Bross, Woo-Jin Han, Jens-Rainer Ohm, Gary J. Sullivan, Thomas Wiegand, "WD4: Working Draft 4 of High-Efficiency Video Coding," JCTVC-F803, JCT-VC, 6th Meeting, (Jul. 14-22, 2011) Joint Collaborative Team on Video Coding (JCT-VC) of ITU-T SG16 WP3 and ISO/IEC JTC1/SC29/WG11. See Chapters 8.4.2.1.1; 8.4.2.1.2; 8.4.2.1.3; 8.4.2.1.4; 8.4.2.1.5; 8.4.2.1.6; and 8.4.2.1.9, pp. i-iv and 103-116.

Japanese Office Action mailed on Mar. 10, 2015 for corresponding Japanese Patent Application No. 2011-239650, with Partial English Translation, 5 pages.

Chen, Jianle, et al., "MVP index parsing with fixed number of candidates, Joint Collaborative Team on Video Coding (JCT-VC) of ITU-T SG16 WP3 and ISO/IEC JTC1/SC29/VVG11," 6th Meeting: Torino, IT, Jul. 2011, JCTVC-F402_r1, pp. 1-17.

\* cited by examiner

VIDEO DECODING APPARATUS AND METHOD

CROSS-REFERENCE TO RELATED APPLICATIONS

This present application is based upon and claims the benefit of priority of the prior Japanese Patent Application No. 2011-239650, filed on Oct. 31, 2011, the entire contents of which are incorporated herein by reference.

FIELD

The embodiments discussed herein are related to a video decoding apparatus, a video coding apparatus, a video decoding method, a video coding method, a video decoding program and a video coding program in which respective pictures are divided into plural blocks for motion compensation on a block basis.

BACKGROUND

A recent video coding technique achieves high compression rate by dividing an image into plural blocks, predicting pixels included in the blocks and encoding the predicted differentials. A prediction mode in which prediction pixels are generated from pixels in a picture to be encoded is referred to as an intra prediction, and a prediction mode in which prediction pixels are generated from a reference image called motion compensation which was encoded in the past is referred to as an inter prediction.

In the video coding apparatus, to perform the inter prediction, a region which is referred to as prediction pixels is expressed by a motion vector which is two-dimensional data with a horizontal component and a vertical component, and the motion vector and predicted differential data of the pixels are coded. In order to reduce a code amount of the motion vector, a prediction vector is generated based on the motion vector of a block which is adjacent to a block to be coded, and a differential vector between the motion vector and the prediction vector is coded. Because an allocation is performed such that the smaller the differential vector is, the smaller the code amount is allocated, it is possible to reduce the code amount of the motion vector and improve coding efficiency.

Further, in general, there are many cases where a motion of a certain block is completely the same as those of its adjacent blocks. For this reason, it is also possible to reduce the code amount of the motion vector by using the motion vector of the adjacent block as the prediction vector, regarding the differential vector as 0 to inherit it as it is, and encoding index information which indicates the adjacent block whose motion vector is inherited.

The video decoding apparatus determines the same prediction vector as the video coding apparatus for the respective blocks, and adds the coded differential vector to the prediction vector to decode the motion vector. For this reason, the video coding apparatus and the video decoding apparatus have the same motion vector predicting part.

In the video decoding apparatus, in general, the respective blocks are decoded in a raster scan or a z-scan from the upper left to the lower right of the image. For this reason, the motion vectors which may be utilized for prediction by the motion vector predicting parts of the video coding apparatus and the video decoding apparatus are motion vectors of the blocks which are adjacent to a process block at left and upper sides of the process block and have already been decoded when the video decoding apparatus decodes the process block.

Further, according to MPEG (Moving Picture Experts Group)-4 AVC/H.264 (also referred to as H.264, hereinafter), there is a case where the prediction vector is determined using the motion vector of the reference picture which was subject to the coding process and the decoding process in past instead of the picture to be processed.

Known techniques for determining the prediction vector include HEVC (High Efficiency Video Coding) which ISO/IEC and ITU-T are aiming at standardization in cooperation. Further, HM Software (version 4.0) is known as reference software.

In the following, an overview of HEVC is described. According HEVC, there are two lists L0 and L1 as a list of referable pictures (also referred to as reference picture lists). For the respective blocks, with the motion vectors corresponding to L0 and L1, a maximum of two reference picture regions can be used for the inter prediction.

In general, L0 and L1 correspond to directions of display time. L0 is a reference list of the past pictures with respect to the picture to be processed. L1 is a reference list of future pictures. The respective entries of the reference picture list have information including stored locations of the corresponding image data and display time information of POC (Picture Order Count) values of the corresponding pictures.

POC is represented by an integer value which indicates display order of the respective pictures and relative display times. Assuming the display time of the picture whose POC value becomes 0 is 0, the display time of a certain picture can be expressed by multiples of the POC value of the picture by a constant.

For example, when a display frequency of a frame is fr (Hz), the display time of the picture whose POC value is p is given by an equation (1). Thus, POC can be regarded as a display time using a certain constant as a unit.

$$\text{Display time} = p \times (fr/2) \qquad \text{equation (1)}$$

If there are two or more entries of a reference picture list, the respective motion vectors specify which reference picture is to be referred to by an index number (also referred to as reference index) in the reference picture list. In particular, if the number of the entries of a reference picture list is only one, the reference index of the motion vector corresponding to the list is automatically $0^{th}$, and thus it is not necessary to explicitly specify the reference index.

In other word, the motion vector of the block includes an L0/L1 list identifier, the reference index, and vector data (Vx, Vy). The reference picture is specified by the L0/L1 list identifier and the reference index. The region in the reference picture is specified by the (Vx, Vy). Vx and Vy are the difference between coordinates of the reference region and the coordinates of the process block (also referred to as the current block) in horizontal and vertical directions, respectively. For example, Vx and Vy are expressed in units of one-fourth pixels. The L0/L1 list identifier and the reference index are referred to as a reference picture identifier, (Vx, Vy) is referred to as vector data, and (0, 0) is referred to as a zero vector.

A merge mode according to HEVC is described. At first, a way of determining the merge mode according to HEVC is described. According to HEVC, a way of determining the prediction vector has two modes which are referred to as a merge mode and a MVP mode, respectively. In the following, the merge mode in particular is described.

According to the merge mode, a set of prediction information which blocks adjacent to the process block in a spatial direction or a time direction have, is used as it is. The set of prediction information includes a prediction flag which indicates whether L0 is valid and whether L1 is valid, the respective indexes of L0 and L1, and the motion vectors of L0 and L1.

If the prediction flag of L0 is valid and the prediction flag of L1 is invalid, it means uni-prediction of L0. If the prediction flag of L0 is invalid and the prediction flag of L1 is valid, it means uni-prediction of L1. If the prediction flag of L0 and the prediction flag of L1 are valid, it means bi-prediction.

Further, if the prediction flag of L0 and the prediction flag of L1 are invalid, it means the block of the intra prediction. Alternatively, instead of using the prediction flag, if the reference picture identifier is the reference index out of the range of the reference picture list, it may express an invalid status, and if the reference picture identifier is the reference index within the range of the reference picture list, it may express a valid status.

A candidate list of the prediction information (also referred to as a prediction information candidate list, hereinafter) is generated. The index in the candidate list designates which prediction information is to be used. Thus, the motion compensation of the process blocks can be performed using the same prediction information as that of the adjacent blocks. Therefore, without coding the motion vector, etc., only by coding the index in the list, the prediction information used for the process block can be sent to the decoding apparatus, thereby reducing the code amount. A flag called merge flag indicates whether the merge mode is valid, and index information called a merge index indicates the index in the prediction information candidate list.

FIG. 1 is a diagram for illustrating an example of a positional relationship between the process block and adjacent blocks. The adjacent blocks are adjacent to the process block in a spatial direction or a time direction. In the example illustrated in FIG. 1, the blocks A0, A1, B0, B1 and B2 are included in the same picture as the process block and are adjacent to the process block in a spatial direction. The block Col is included in the picture which was previously processed and is adjacent to the process block in a spatial direction.

According to HM4, among these adjacent blocks, the candidates are listed up to five as the prediction information candidate list. If there is the intra prediction block among the adjacent blocks, the intra prediction block is not included in the prediction information candidate list. Further, if there are plural prediction information items whose reference picture identifiers and vector information, etc., are all the same, these duplicated prediction information items are deleted because of redundancy.

The deletion of the redundant candidates causes the change of the number of the candidates, leading to the change in a way of allocating the codes. FIG. 2 is a diagram for illustrating an example of allocating the codes according to the number of the candidates. As illustrated in FIG. 2, if the number of the candidates is reduced from "5" to "3", the allocated codes and bit numbers are changed.

At that time, it is assumed that there is an error in a predetermined picture because of the data break, etc., and the vector values are not correctly decoded. In this case, even a picture, which refers to the block of the predetermined picture as the Col picture which is adjacent in a time direction, cannot have the adjacent vector values correctly decoded.

Thus, a mismatch occurs by deleting the redundant candidates in the coder and the decoder, as the number of the candidates differs between the coder and the decoder. For this reason, even the picture which uses an error occurring picture as the Col picture has a mismatch of the number of the candidates, and the data cannot be correctly decoded from the block for which the index is not correctly decoded. In this way, the error is propagated. Thus, it is desirable to fix the number of the candidates and not to change the way of allocating the codes, or derive only from the coding information of the picture.

However, if the number of the candidates is fixed and the valid number of the candidates of the prediction information candidate list is less than a predetermined number of the candidates, and the codes are allocated using the predetermined number as a maximum number, the code is also allocated to an invalid useless index, which causes the redundancy and reduction of the coding efficiency.

According to the HEVC, in order to the reduce the redundancy even if the number of the candidates is fixed, the candidate is generated from the previously listed prediction information by the following three processes and is added to the prediction information candidate list if the number the candidates of the prediction information candidate list is less than the predetermined number of the candidates.

<Combined Bi-Predictive Merge>

(1) The prediction information candidate for bi-prediction is generated from two prediction information candidates previously listed. FIG. 3 is a diagram for explaining the Combined Bi-predictive Merge.

In the example illustrated in FIG. 3, at first, two prediction information candidates, which are to be a source of generation, are selected from the prediction information candidate list previously listed. Two prediction information candidates are A and B, respectively. If the L0 prediction flag of A is valid and the L1 prediction flag of B is valid, the prediction information candidate is generated as follows.

The reference index of L0 of the generated prediction information candidate is the reference index of L0 of A.

The motion vector mvL0Cand of L0 of the generated prediction information candidate is the motion vector mvL0 [A] of A.

The reference index of L1 of the generated prediction information candidate is the reference index of L1 of B.

The motion vector mvL1Cand of L1 of the generated prediction information candidate is the motion vector mvL1 [B] of L1 of B.

If the generated prediction information candidate is not included in the prediction information candidate list, it is added to the candidate list.

If the predetermined number of the candidates is not reached by the generation of the prediction information candidate, new prediction information candidates are generated in the same manner from L1 of A or L0 of B by exchanging the reference lists. If the predetermined number of the candidates is not reached even by new prediction information candidates, prediction information candidates are generated until the predetermined number of the candidates is reached by selecting different pairs of the prediction information candidates from the prediction information candidate list and repeating the same process.

<Non Scaled Predictive Merge>

(2) The prediction information candidate for bi-prediction is generated from a prediction information candidate previously listed. FIG. 4 is a diagram for explaining the Non Scaled Predictive Merge.

In the example illustrated in FIG. 4, at first, a prediction information candidate, which is to be a source of generation, is selected from the prediction information candidate list previously listed. The selected one is A. If the prediction flag of LX of A with respect to the list X (X=0, 1) is valid, the following process is performed.

It is assumed that LY is the reference list other than LX (i.e., Y=1−X). If a difference T between the process picture including the process block and the reference picture of LX indicated by the reference index of LX of A is equal to a difference T' between the process picture and the reference picture of LY indicated by the reference index of LX of A, the prediction information candidate is generated as follows.

The reference index of LX of the generated prediction information candidate is the reference index of LX of A.

The motion vector mvLXCand of LX of the generated prediction information candidate is mvLX [A] of LX of A.

The reference index of LY of the generated prediction information candidate is the reference index of LX of A.

The motion vector mvLYCand of LY of the generated prediction information candidate is a minus motion vector (−mvLX [A]) of LX of A.

If the generated prediction information candidate is not included in the prediction information candidate list, it is added to the candidate list.

If the predetermined number of the candidates is not reached even by a generation of the prediction information candidate, prediction information candidates are generated until the predetermined number of the candidates is reached by changing the prediction information candidate as a source of generation and repeating the same process.

<Zero Vector Addition Process>

If the predetermined number of the candidates is not reached even by these two processes described above, zero vectors are added and the reference indexes of L0 and L1 are incremented.

According to the known HEVC, if the number of the merge candidates does not reach the predetermined number of the candidates, these two processes other than (3) zero vector addition process, among the processes to generate new prediction information candidates in order to fill the candidate list, only generate the bi-predictive vectors. For this reason, in the case of the P picture which is limited to the vector of L0, there is a problem that the candidate other than zero vector cannot be added.

[Non-Patent Document 1] ISO/IEC 14496-10 (MPEG-4 Part 10)/ITU-T Rec.H.264

[non-Patent Document 2] Thomas Wiegand, Woo-Jin Han, Benjamin Bross, Jens-Rainer Ohm, Gary J. Sullivan, "WD4: Working Draft 4 of High-Efficiency Video Coding" JCTVC-F803, JCT-VC 6th Meeting, July, 2011

SUMMARY

A video decoding apparatus according to one aspect of the disclosure performs a decoding process, on a process block basis, using a motion vector of the process block and prediction information candidates of the motion vector. The video decoding apparatus includes a prediction information storing part configured to store prediction information including motion vectors of adjacent blocks and reference picture identifiers, the adjacent blocks being adjacent to the process block in a spatial direction or a time direction, the reference picture identifiers indicating pictures that the motion vectors refer to; a first prediction information candidate generating part configured to acquire the prediction information of the adjacent block from the prediction information storing part to generate the prediction information candidate if motion compensation of the block is performed using the same prediction information as the prediction information of the adjacent block; and a second prediction information candidate generating part configured to add prediction information to the prediction information candidates if the number of the prediction information candidates is less than a predetermined number and two prediction information items of the prediction information candidates have the reference picture identifiers indicating the same picture, the added prediction information including an averaged motion vector of two motion vectors included in these two prediction information items.

A video coding apparatus according to another aspect of the disclosure performs a coding process, on a process block basis, using a motion vector of the process block and prediction information candidates of the motion vector, the process blocks being generated by dividing an input image. The video coding apparatus includes a prediction information storing part configured to store prediction information including motion vectors of adjacent blocks and reference picture identifiers, the adjacent blocks being adjacent to the process block in a spatial direction or a time direction, the reference picture identifiers indicating pictures that the motion vectors refer to; a first prediction information candidate generating part configured to acquire the prediction information of the adjacent block from the prediction information storing part to generate the prediction information candidate if motion compensation of the block is performed using the same prediction information as the prediction information of the adjacent block; and a second prediction information candidate generating part configured to add prediction information to the prediction information candidates if the number of the prediction information candidates is less than a predetermined number and two prediction information items of the prediction information candidates have the reference picture identifiers indicating the same picture, the added prediction information including an averaged motion vector of two motion vectors included in these two prediction information items.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

In the following, embodiments will be described with reference to the accompanying drawings.

First Embodiment

[Configuration]

Figure 5:
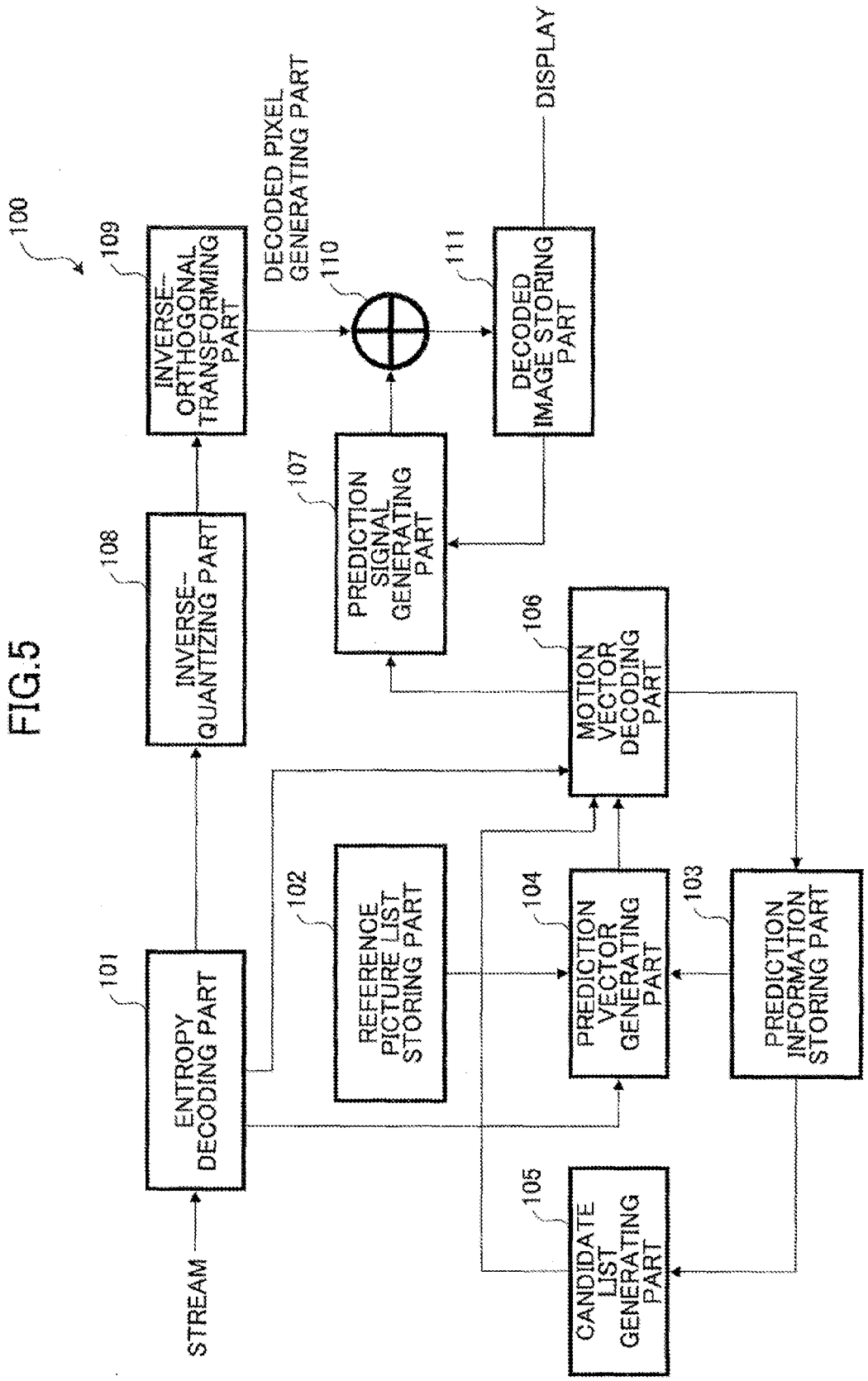
FIG. 5 is a diagram for illustrating an example of a configuration of a video decoding apparatus according to the first embodiment.

FIG. 5 is a diagram for illustrating an example of a configuration of a video decoding apparatus 100 according to the first embodiment. The video decoding apparatus 100 illustrated in FIG. 5 includes an entropy decoding part 101, a reference picture list storing part 102, a prediction information storing part 103, a prediction vector generating part 104, a candidate list generating part 105, a motion vector decoding part 106, a prediction signal generating part 107, an inverse-quantizing part 108, an inverse-orthogonal transforming part 109, a decoded pixel generating part 110 and a decoded image storing part 111.

The entropy decoding part 101 performs an entropy decoding for the compressed stream to decode, according to a merge flag, a merge index or a prediction flag of L0 and L1 of a process block, a reference index, a differential vector, a prediction candidate index, orthogonal transformation coefficients, etc.

For example, the entropy decoding part 101 decodes the merge index if the decoded merge flag is valid. Further, the entropy decoding part 101 decodes prediction flag information of L0 and L1 if the decoded merge flag is invalid.

Here, if the prediction flag of L0 is valid, the reference index, the differential vector information and the prediction candidate index of L0 are decoded. If the prediction flag of L1 is valid, the reference index, the differential vector information and the prediction candidate index of L1 are decoded.

The reference picture list storing part 102 stores the picture information including POCs of referable pictures for the process block and stored locations of the image data.

The prediction information storing part 103 stores prediction information including motion vectors of adjacent blocks which are adjacent to the process block in a spatial direction or a time direction and a reference picture identifier which indicates a picture to which the motion vector refers. Information of the motion vector included in the prediction information is generated by the motion vector decoding part 106.

The prediction vector generating part 104 acquires the prediction flags of L0 and L1, the reference indexes, etc., to generate a candidate list of the prediction vectors for the motion vector of the process block. The prediction vector generating part 104 may generate the candidate list of the prediction vectors from the prediction information of the adjacent blocks, using the HEVC technique disclosed in non-Patent Document 2, for example.

The candidate list generating part 105 generates the candidate list of the prediction vectors if the merge flag is valid. This list is also referred to as a prediction information candidate list. If the merge flag is valid, the motion compensation of the process block is performed using the same prediction information as the adjacent block. It is noted that the process of the candidate list generating part 105 is described hereinafter.

The motion vector decoding part 106 decodes the motion vector by taking a sum of the prediction vector candidate indicated by the prediction candidate index and the differential vector if the prediction flags of L0 and L1 acquired from the entropy decoding part 101 are valid.

Further, the motion vector decoding part 106 acquires the prediction information indicated by the merge index from the prediction information candidate list acquired from the candidate list generating part 105 to decode the reference indexes and the motion vectors of L0 and L1.

The prediction signal generating part 107 generates a prediction pixel signal using the decoded prediction flags, the reference indexes, the motion vectors of L0 and L1 and the decoded image stored in the decoded image storing part 111.

The inverse-quantizing part 108 performs the inverse-quantization of the orthogonal transformation coefficients acquired from the entropy decoding part 101. The inverse-orthogonal transforming part 109 performs the inverse-orthogonal transformation of the inverse-quantized output signal to generate a prediction error signal. The prediction error signal is output to the decoded pixel generating part 110.

The decoded pixel generating part 110 takes a sum of the prediction pixel signal and the prediction error signal to generate the decoded pixels.

The decoded image storing part 111 stores the decoded image including the decoded pixels generated by the decoded pixel generating part 110. The decoded image stored in the decoded image storing part 111 is output on a displaying part such as a display.

[Configuration of Candidate List Generating Part]

Figure 6:
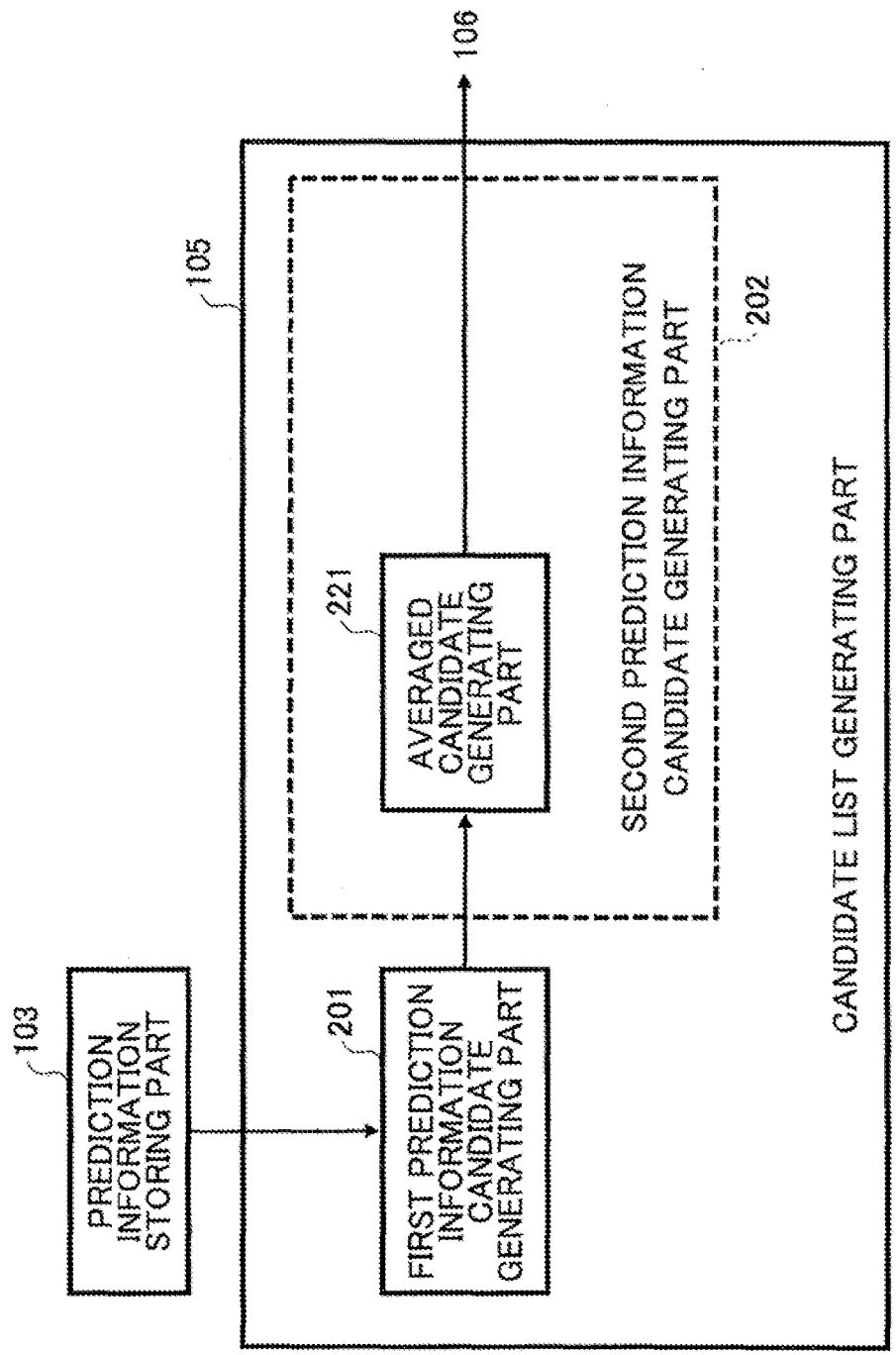
FIG. 6 is a block diagram of an example of a candidate list generating part (no. 1) according to the first embodiment.

Next, the configuration of the candidate list generating part 105 is described. FIG. 6 is a block diagram of an example of a candidate list generating part (no. 1) according to the first embodiment. The candidate list generating part 105 illustrated in FIG. 6 includes a first prediction information candidate generating part 201 and a second prediction information candidate generating part 202.

First, the candidate list generating part 105 generates the prediction information candidate list, which includes the candidates of the prediction information of the process block, based on the prediction information of the adjacent blocks. The prediction information of the process block is element of the prediction information candidate list which is specified by the merge index decoded by the entropy decoding part 101.

The prediction information includes parameters necessary to generate the inter prediction pixels. The parameters include at least the respective prediction flags, the reference indexes and the motion vectors of the L0 list and the L1 list.

Figure 1:
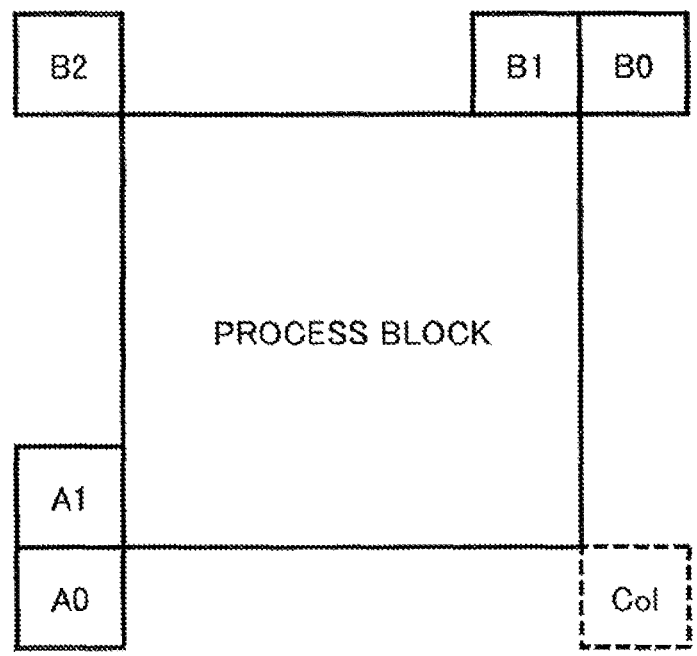
FIG. 1 is a diagram for illustrating an example of a positional relationship between the process block and adjacent blocks.
Figure 2:
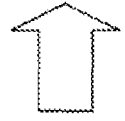
FIG. 2 is a diagram for illustrating an example of allocating the codes according to the number of the candidates.
Figure 3:
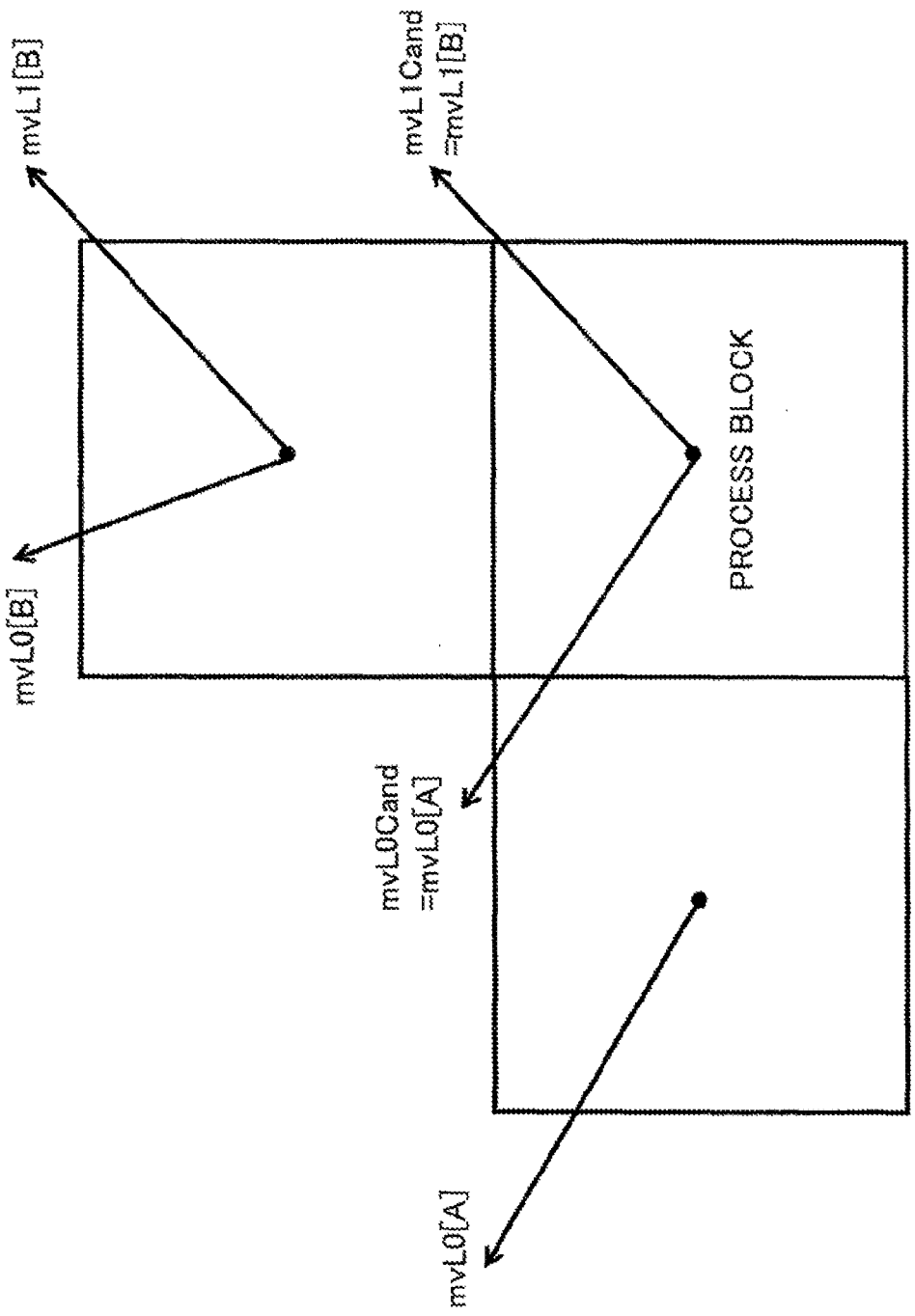
FIG. 3 is a diagram for explaining the Combined Bi-predictive Merge.
Figure 4:
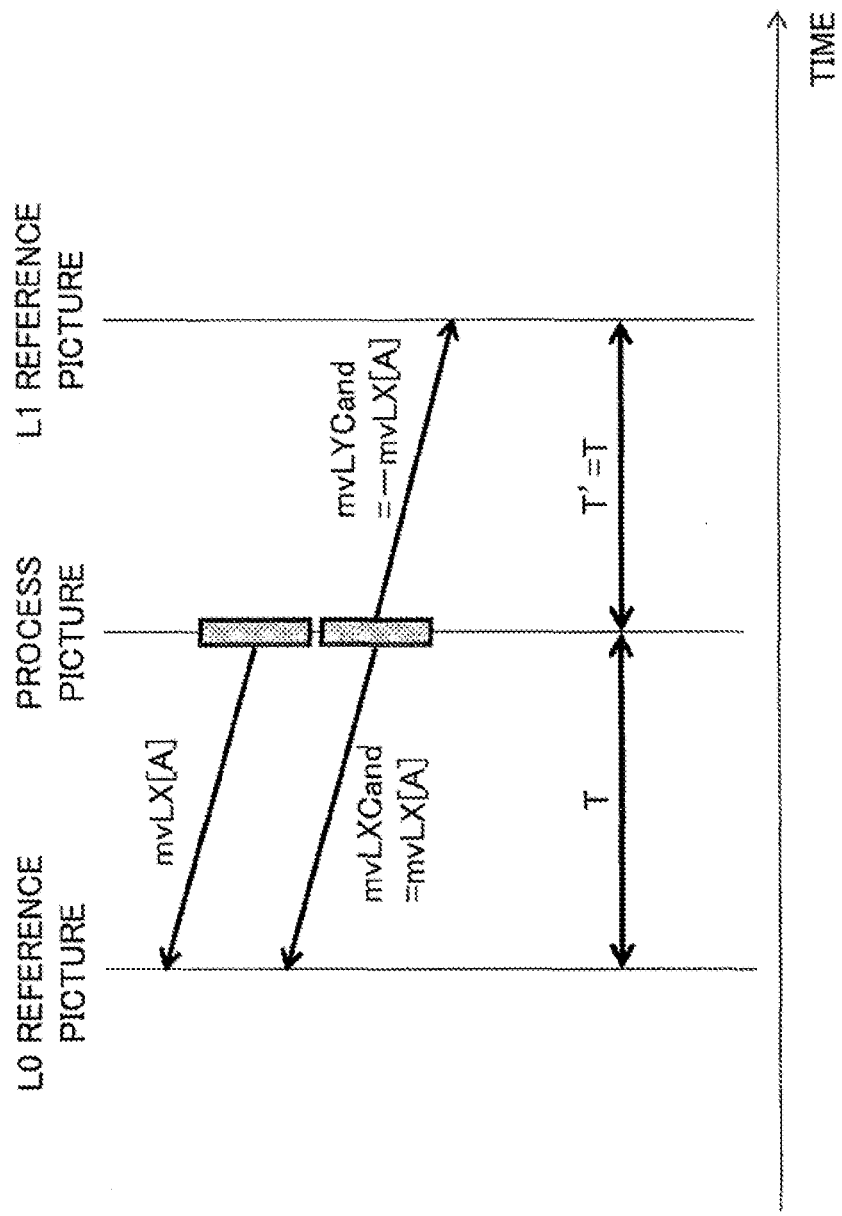
FIG. 4 is a diagram for explaining the Combined Bi-predictive Merge.

The first prediction information candidate generating part 201 acquires, for example, five prediction information items which the adjacent blocks (see FIG. 1) adjacent to the process block have from the prediction information storing part 103, and lists them in the prediction information candidate list. In the following, the prediction information included in the prediction information candidate list is also referred to as the prediction information candidate.

Among the adjacent blocks, blocks which have not been processed yet, blocks which are located out of the screen, or blocks for which the intra prediction is used are not listed in the prediction information candidate list. The first prediction information candidate generating part 201 deletes the duplicated elements listed in the prediction information candidate list.

The second prediction information candidate generating part 202 generates an additional prediction information candidate if the number of the candidates of the prediction information candidate list generated by the first prediction information candidate generating part 201 is less than a predetermined number. The predetermined number is five, for example.

If the second prediction information candidate generating part 202 generates the additional prediction information candidate, it performs an averaged vector generating process to generate an averaged vector of two prediction information items included in the prediction information candidate list. The second prediction information candidate generating part 202 generates prediction information including the generated averaged vector as the additional prediction information candidate.

It is noted that if the number of the candidates does not reach the predetermined number even if the additional prediction information candidate is generated by the averaged vector generating process, another candidate generating process may be performed.

Figure 7:
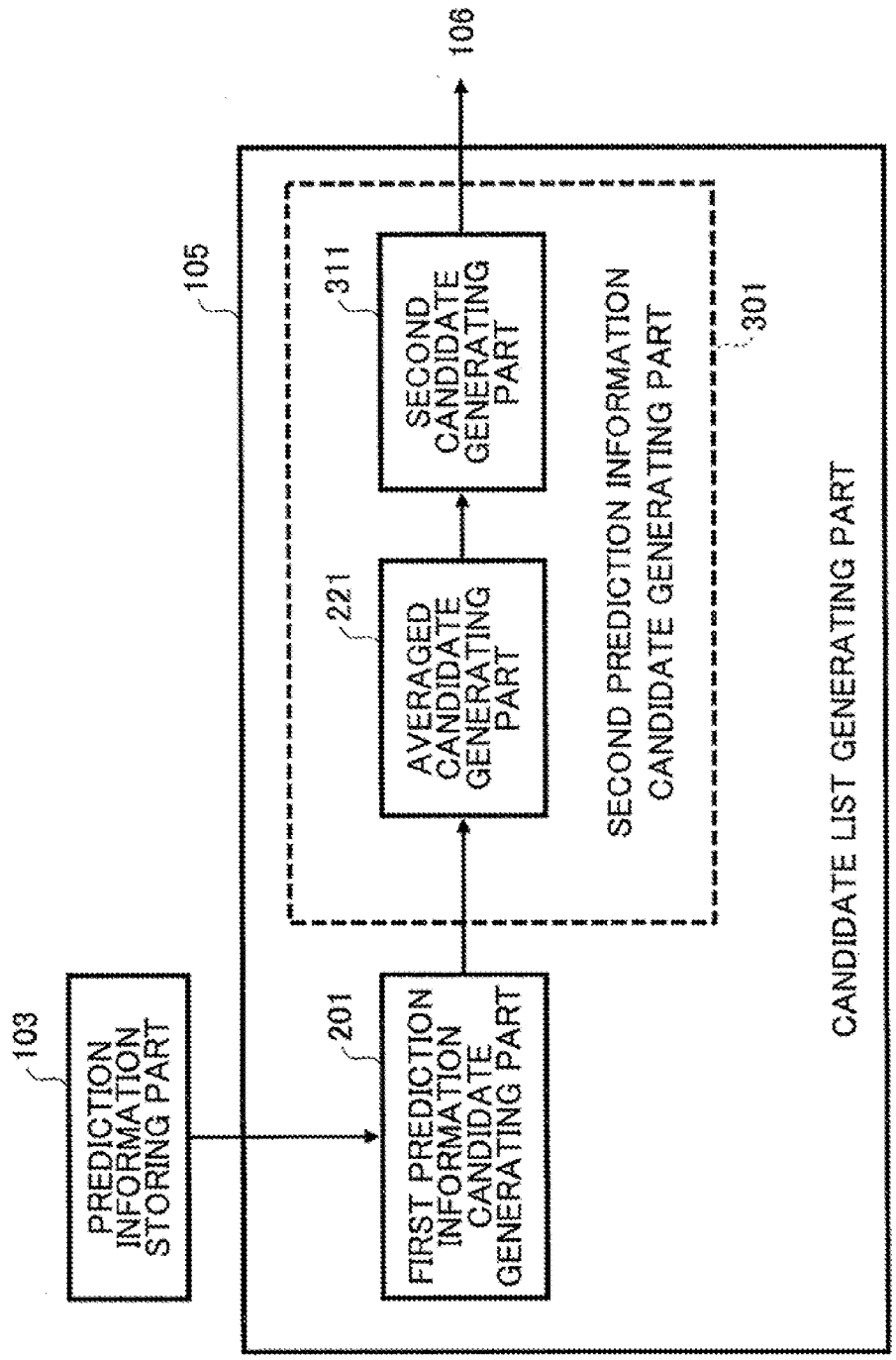
FIG. 7 is a block diagram of an example of a candidate list generating part (no. 2) according to the first embodiment.

FIG. 7 is a block diagram of an example of a candidate list generating part (no. 2) according to the first embodiment. The candidate list generating part 105 illustrated in FIG. 7 includes a second prediction information candidate generating part 301 including an averaged candidate generating part 221 and a second candidate generating part 311.

The second candidate generating part 311 performs a candidate generating process different from that of the averaged candidate generating part 221. For example, the second candidate generating part 311 performs the Combined Bi-predictive Merge or the Non Scaled Predictive Merge described above.

It is noted that in the example illustrated in FIG. 7 the respective processes of the averaged candidate generating part 221 and the second candidate generating part 311 are performed in this order; however, the process of the second candidate generating part 311 may be performed prior to the process of the averaged candidate generating part 221.

As illustrated in FIGS. 6 and 7, the second candidate generating part may include at least the averaged candidate generating part configured to perform a process for generating the averaged vector. In the following, the second candidate generating part is described using the example illustrated in FIG. 7.

<<Configuration of Averaged Candidate Generating Part>>

In the following, the averaged candidate generating part 221 is described in detail. There are a case where the averaged candidate generating part 221 processes the uni-predictive picture and a case where the averaged candidate generating part 221 processes the bi-predictive picture. At first, the case where the averaged candidate generating part 221 processes the uni-predictive picture is described.

(Process of Uni-Predictive Picture)

Figure 8:
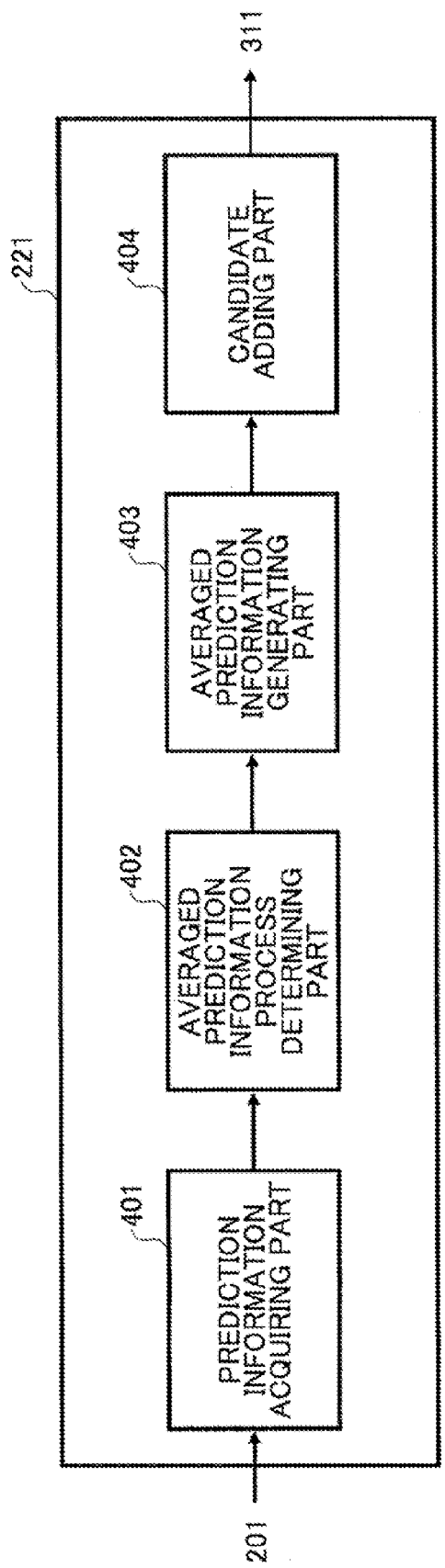
FIG. 8 is a block diagram of an example of an averaged candidate generating part (no. 1) according to the first embodiment.

FIG. 8 is a block diagram of an example of an averaged candidate generating part (no. 1) according to the first embodiment. The averaged candidate generating part 221 illustrated in FIG. 8 includes a prediction information acquiring part 401, an averaged prediction information process determining part 402, an averaged prediction information generating part 403 and a candidate adding part 404.

First, an overview of the process of the averaged candidate generating part 221 is described. The averaged candidate generating part 221 checks a predetermined number set in advance. If the number of the candidates of the prediction information candidate list is less than the predetermined number, the averaged candidate generating part 221 repeats the averaging process described hereinafter. The averaged candidate generating part 221 generates new candidates until the number of times repeating the process is equal to a predetermined repeating number or the number of the candidates reaches the predetermined number. The predetermined number is five, for example.

Next, respective parts of the averaged candidate generating part 221 are described. The prediction information acquiring part 401 acquires two prediction information candidates as a source of generation. The prediction information acquiring part 401 may acquire two prediction information candidates from the prediction information candidate list already listed or the prediction information storing part 103. Here, it is assumed that two prediction information candidates are acquired from the prediction information candidate list. It is noted that two prediction information candidates acquired from the prediction information candidate list are indicated by A and B, respectively.

The averaged prediction information process determining part 402 determines whether the prediction flags of L0 of A and B are valid and the reference pictures of L0 of A and B are the same. The averaged prediction information process determining part 402 determines that the averaging process is to be performed if the condition is met.

Here, in order to determine that the reference pictures are the same, the averaged prediction information process determining part 402 may determine that the reference indexes are the same or may determine that the display times of the reference pictures are the same.

If it is determined that the averaging process is to be performed, the averaged prediction information generating part 403 generates the prediction information candidate to be added from two prediction information candidates. If it is determined that the averaging process is not to be performed, the prediction information acquiring part 401 acquires two new prediction information candidates. Such a process is repeated subsequently.

Figure 9:
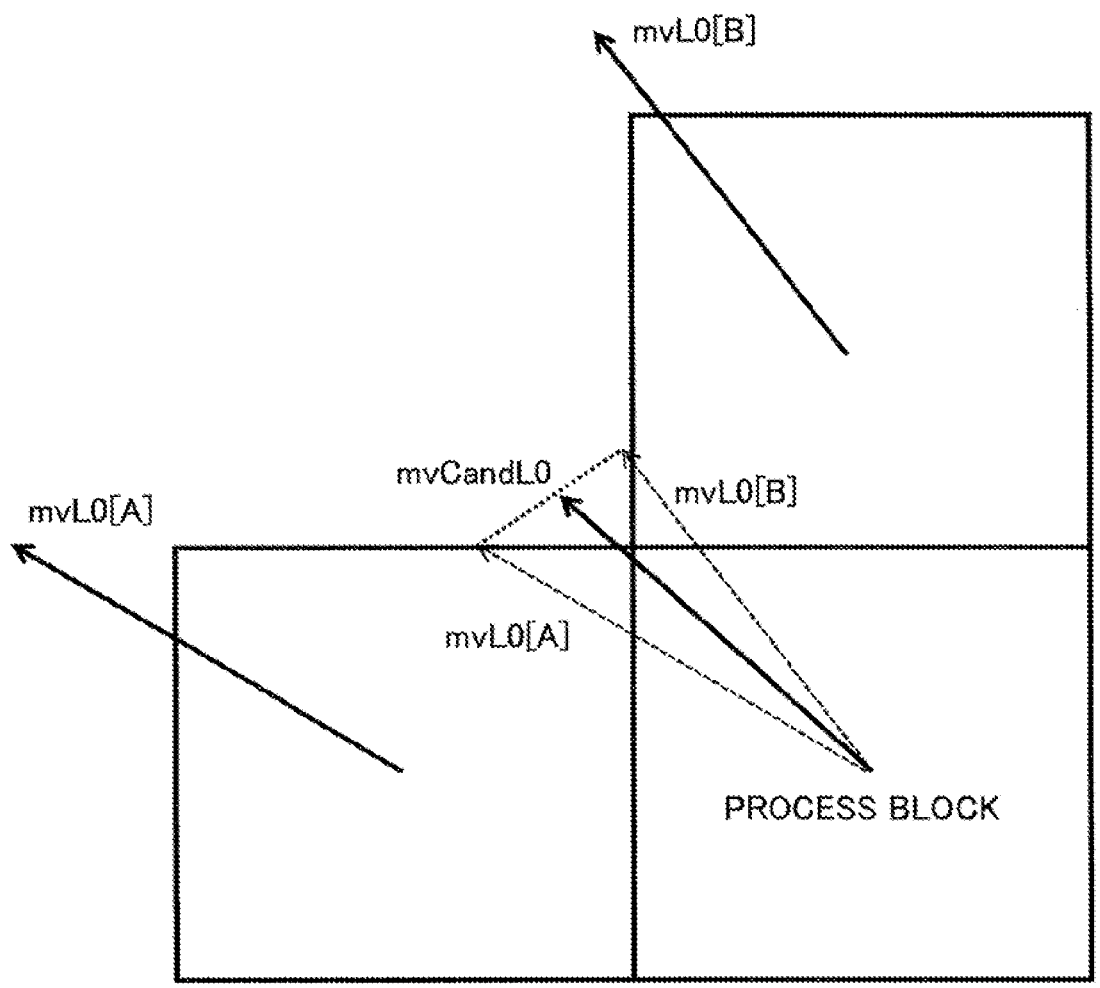
FIG. 9 is a diagram for illustrating an example of averaged vector generation (no. 1).

The averaged prediction information generating part 403 performs the averaging process of the prediction information, for example. The averaging process generates an output of prediction information Cand. FIG. 9 is a diagram for illustrating an example of average vector generation (no. 1). The averaged vector is generated by the averaging process.

In the example illustrated in FIG. 9, if the motion vector of A is mvL0 [A], the motion vector of B is mvL0 [B] and the motion vector of the prediction information Cand is mvCandL0, the motion vector of the prediction information Cand is given by the following equation (2).

$$mvCandL0=(mvL0[A]+mvL0[B])/2 \qquad \text{equation (2)}$$

The averaged prediction information generating part 403 can determine the averaged vector by calculating an average of the motion vectors included in two prediction information items.

Returning to FIG. 8, the averaged prediction information generating part 403 determines the reference index of the prediction information Cand. For example, if the reference index of A is RefIndxL0 [A] and the reference index of the prediction information Cand is RefIndxCandL0, the reference index of the prediction information Cand can be determined by the following equation (3).

$$\text{RefIndxCandL0}=\text{RefIndxL0}[A] \quad \text{equation (3)}$$

The averaged prediction information generating part 403 makes the prediction flag PredFlagCandL0 of L0 of the prediction information Cand valid.

Further, the averaging process may be implemented by a right-shift process. In order to round the fractions toward zero, the following equations (4) and (5) are used.

$$\text{mvCandL0}=(\text{mvL0}[A]+\text{mvL0}[B])\!>\!>\!1 \text{ (if mvL0}[A]+ \text{mvL1}[B] \text{ is greater or equal to 0)} \quad \text{equation (4)}$$

$$\text{mvCandL0}=(\text{mvL0}[A]+\text{mvL0}[B])+1)\!>\!>\!1 \quad \text{equation (5)}$$

The candidate adding part 404 determines whether there is the same prediction information candidate in the prediction information candidate list as the prediction information Cand including PredFlagL0, RefIdxCandL0 and mvCandL0 calculated by the equation (2).

If the prediction information Cand is not included in the prediction information candidate list, the candidate adding part 404 adds the prediction information Cand to the prediction information candidate list. With this arrangement, it is possible to add such prediction information that improves the prediction efficiency to the prediction information candidate list even with the uni-predictive picture.

(Process of Bi-Predictive Picture)

Figure 10:
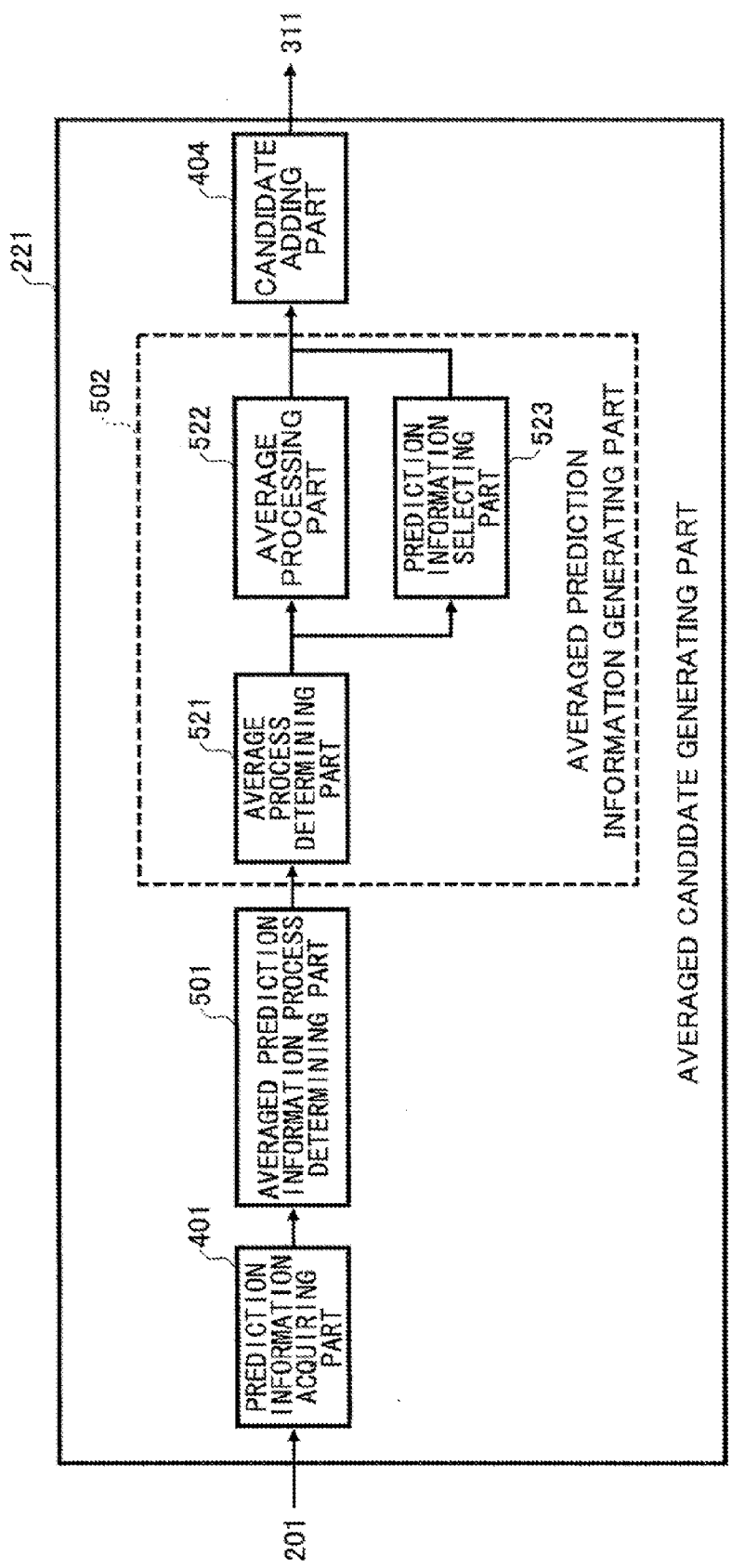
FIG. 10 is a block diagram of an example of an averaged candidate generating part (no. 2) according to the first embodiment.

FIG. 10 is a block diagram of an example of an averaged candidate generating part (no. 2) according to the first embodiment. The averaged candidate generating part 221 illustrated in FIG. 10 includes a prediction information acquiring part 401, an averaged prediction information process determining part 501, an averaged prediction information generating part 502 and a candidate adding part 404. The elements illustrated in FIG. 10, which are the same as those illustrated in FIG. 8, are given the same reference numerals and the explanation is omitted.

The averaged prediction information generating part 502 illustrated in FIG. 10 includes an average process determining part 521, an average processing part 522 and a prediction information selecting part 523 in order to process the bi-predictive picture.

The averaged prediction information process determining part 501 determines whether the prediction flags of L0 of two prediction information items A and B acquired from the prediction information candidate list are valid, and the reference pictures of L0 of A and B are the same. Alternatively, the averaged prediction information process determining part 501 determines whether the prediction flags of L1 of A and B are valid, and the reference pictures of L1 of A and B are the same. The averaged prediction information process determining part 501 determines that the averaging process is to be performed if one of these conditions is met.

In other words, if the averaging process is possible for one of L0 and L1, it determines that the averaging process is to be performed.

If it is determined that the averaging process is to be performed, the averaged prediction information generating part 502 performs the averaging process. If it is determined that the averaging process is not to be performed, the prediction information acquiring part 401 acquires two new prediction information candidates. Such a process is repeated subsequently.

The average process determining part 521 determines whether the averaging process with the motion vectors of L0 is possible by determining whether the reference indexes of L0 of A and B are the same. For example, the average process determining part 521 determines that the averaging process is to be performed if the L0 prediction flags of A and B are valid and the reference indexes are the same. The averaged prediction information process determining part 521 determines that a prediction information selecting process is to be performed if the condition is not met.

Further, the average process determining part 521 determines whether the averaging process with the motion vectors of L1 is possible by determining whether the reference indexes of L1 of A and B are the same. For example, the average process determining part 521 determines that the averaging process is to be performed if the L1 prediction flags of A and B are valid and the reference indexes are the same. The averaged prediction information process determining part 521 determines that a prediction information selecting process is to be performed if the condition is not met.

The average processing part 522 performs the averaging process with a predetermined list for which it is determined by the average process determining part 521 that the averaging process is possible. The averaging process is the same as the process described above with reference to the averaged prediction information generating part 403 if L0 is replaced with a predetermined list LX (X=0 or 1), and thus the explanation is omitted.

The prediction information selecting part 523 selects A or B with a predetermined list for which it is determined by the average process determining part 521 that the averaging process is not possible, and outputs the selected prediction information as the prediction information Cand. However, if the prediction flags of A and B are invalid, the prediction information selecting part 523 makes the prediction flag PredFlagCandLX of LX of the prediction information Cand invalid.

Here, it is assumed that the motion vector of A is mvLX [A], the motion vector of B is mvLX [B] and the motion vector of Cand is mvCandLX. At that time, if the prediction flag of B is invalid, or if the prediction flag of A is valid and the reference index of A is less than or equal to the reference index of B, the prediction information selecting part 523 determines the motion vector of LX by the following equation (6).

$$\text{mvCandLX}=\text{mvLX}[A] \quad \text{equation (6)}$$

Further, if the reference index of A is RefIdxLX [A] and the reference index of the prediction information Cand is RefIdxCandLX, the prediction information selecting part 523 determines the reference index of LX by the following equation (7)

$$\text{RefIdxCandLX}=\text{RefIdxLX}[A] \quad \text{equation (7)}$$

Further, the prediction information selecting part 523 makes the prediction flag RefFlagCandLX of LX of the prediction information Cand valid.

Otherwise (if the prediction flag of A is invalid, or if the reference index of A is greater than the reference index of B), the prediction information selecting part 523 determines the motion vector of LX by the following equation (8).

$$\text{mvCandLX}=\text{mvLX}[B] \quad \text{equation (8)}$$

Further, if the reference index of B is RefIdxLX [B] and the reference index of prediction information Cand is RefIdxCandLX, the prediction information selecting part 523 determines the reference index of LX by the following equation (9).

$$RefIdxCandLX=RefIdxLX[B] \quad \text{equation (9)}$$

Further, the prediction information selecting part 523 makes the prediction flag RefFlagCandLX of LX of the prediction information Cand valid.

Here, the prediction information selecting part 523 selects the one of A and B which has the smaller reference index; however, the selection method is not limited to this. For example, the prediction information selecting part 523 acquires the display times indicated by the reference indexes from the reference picture list storing part 102. Then, the prediction information selecting part 523 calculates the differential with respect to the display time of the current process picture, and may select the one with the reference index indicating the reference picture whose display time is closer to that of the current process picture.

Figure 11:
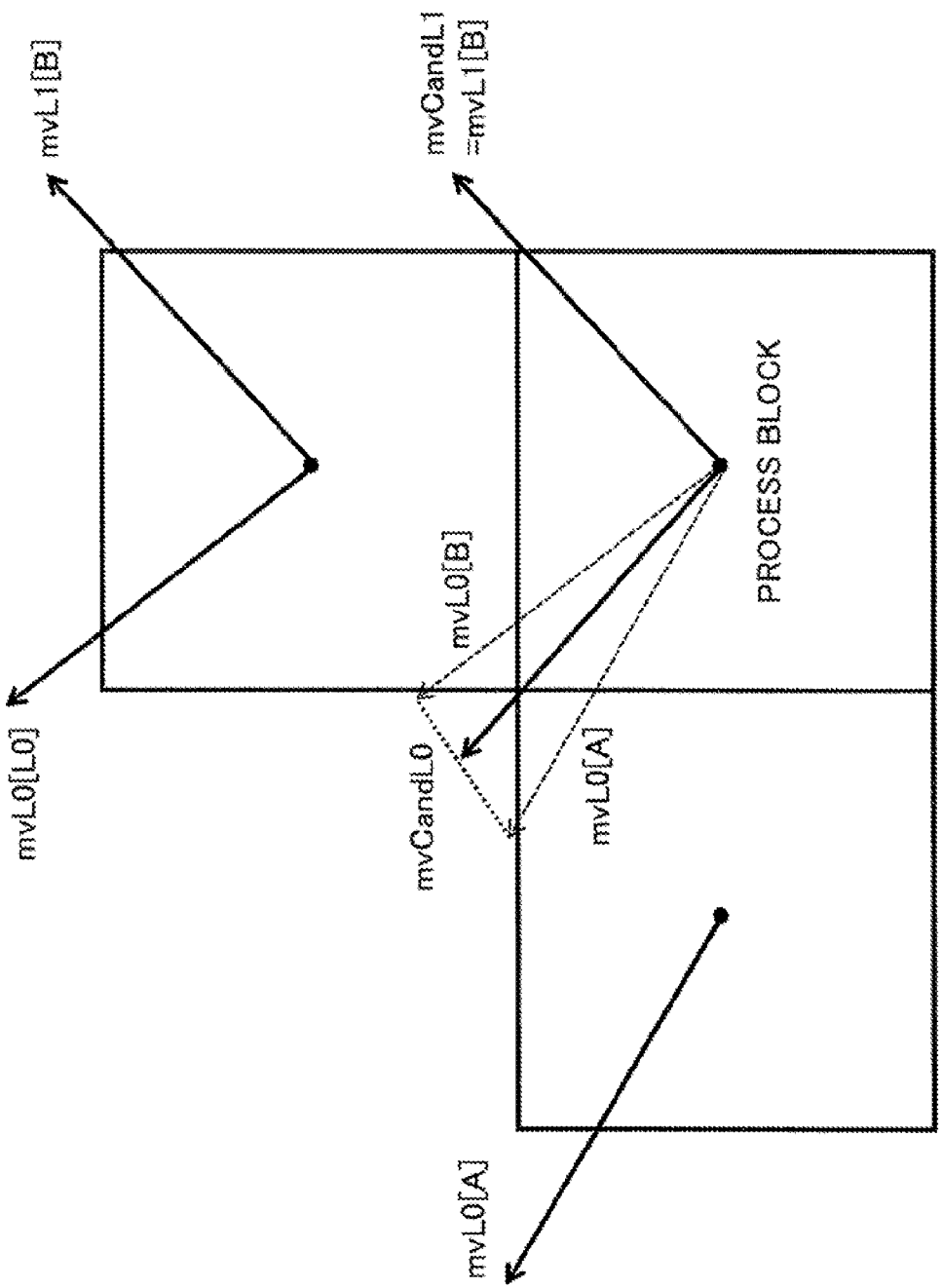
FIG. 11 is a diagram for illustrating an example of averaged vector generation (no. 2).

FIG. 11 is a diagram for illustrating an example of average vector generation (no. 2). In the example illustrated in FIG. 11, the process block is included in the bi-predictive picture and it is assumed that it is determined that the averaging process is possible for the L0 list and averaging process is not possible for the L1 list. In the example illustrated in FIG. 11, mvCandL0 is calculated by the average processing part 522 as follows, and mvL1 [B] is selected as mvCandL1 by the prediction information selecting part 523.

$$mvCandL0=(mvL0[A]+mvL0[B])/2$$

With this arrangement, it is possible to add the prediction information including the averaged vector to the prediction information candidate list. According to the candidate list generating part 105 of the first embodiment, it is possible to add the prediction information candidate having the averaged vector even if the process block belongs to the uni-predictive picture (i.e., P-picture) (see FIG. 9) or if there is only the prediction information of L0 or L1 in the adjacent blocks.

Further, if the process block belongs to the bi-predictive picture (i.e., B-picture) and the adjacent blocks include the bi-predictive blocks, the prediction information candidate having the motion vectors illustrated in FIG. 11 can be added.

It is noted that the prediction information candidate may be added by performing another process for generating the prediction information before or after performing the process for adding the averaged vector described above. Another process for generating the prediction information may be the Combined Bi-predictive Merge Candidates process or the Non Scaled Predictive Merge Candidates process disclosed with reference to HEVC in non-Patent Document 2, for example.

[Operations]

Figure 12:
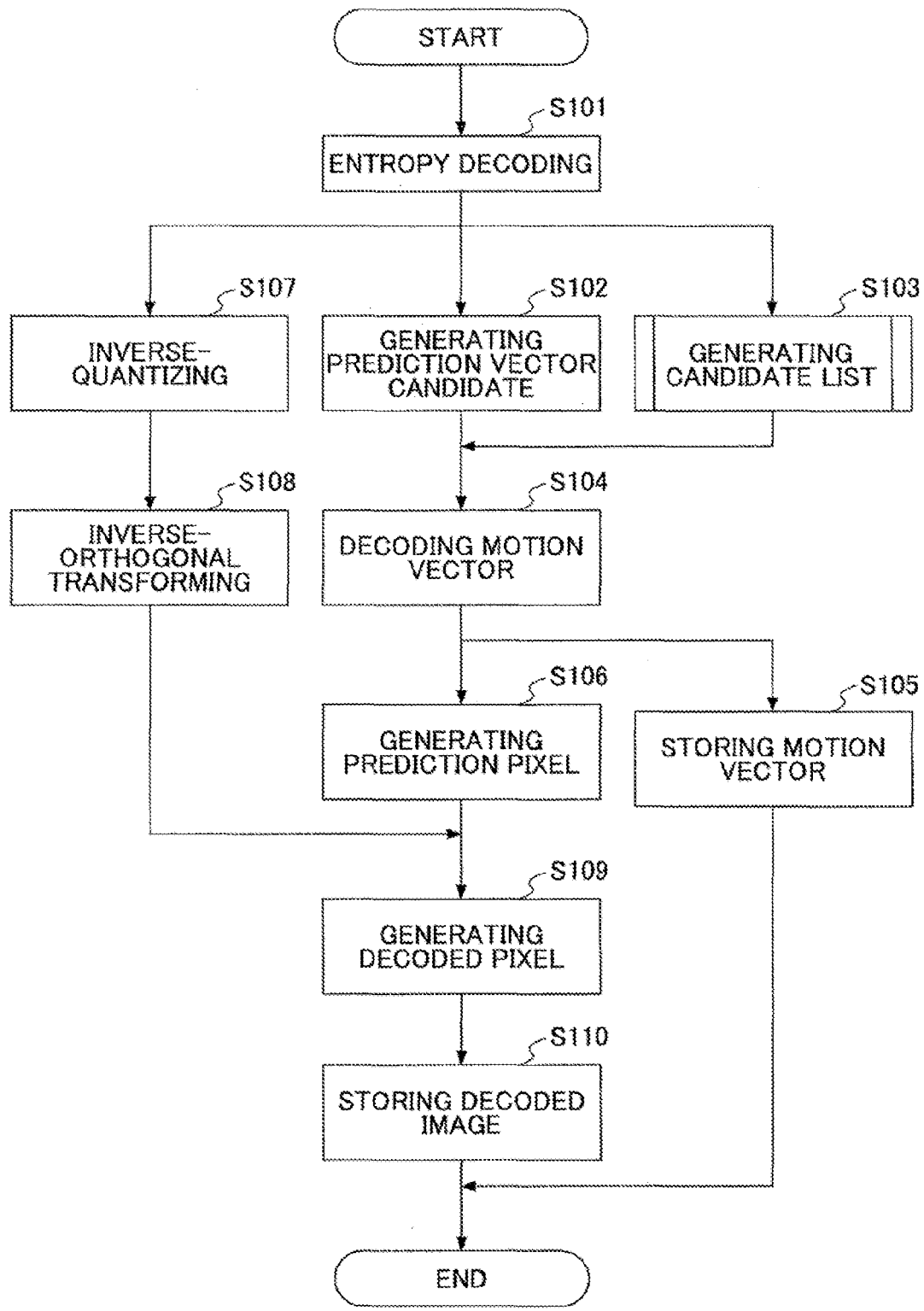
FIG. 12 is a flowchart for illustrating an example of a process of the video decoding apparatus according to the first embodiment.

In the following, operations of the video decoding apparatus 100 according to the first embodiment are described. FIG. 12 is a diagram for illustrating an example of a process of the video decoding apparatus according to the first embodiment.

In step 101, the entropy decoding part 101 performs the entropy decoding of the input stream. The entropy decoding part 101 decodes the merge flag, and decodes the merge index if the merge flag is valid.

Further, the entropy decoding part 101 decodes the prediction flags of L0 and L1 if the merge flag is invalid, and decodes the reference index and the deferential vector, the prediction candidate index, the orthogonal transformation coefficients, etc., if the merge flag is valid.

In step 102, if the merge flag is invalid, the prediction vector generating part 104 calculates the list of the prediction vector candidates of L0 and L1 using the decoded prediction flags, the reference indexes, the motion vector information of L0 and L1, etc. The list of the prediction vector candidates may be generated from the prediction information of the adjacent blocks as is the case with HEVC, for example.

In step 103, if the merge flag is valid, the candidate list generating part 105 generates the prediction information candidate list. The generation of the prediction information candidate list is described above with reference to FIGS. 6 and 7. It is noted that, in step 103, if the number of the candidates is less than the predetermined number, the prediction information candidate can be added by calculating the averaged vector even when the process block belongs to the uni-predictive picture or the bi-predictive picture.

In step 104, if the merge flag is invalid, the motion vector decoding part 106 acquires the prediction candidate indexes and the differential vector information of L0 and L1 decoded by the entropy decoding part 101. The motion vector decoding part 106 calculates, for each of L0 and L1, the prediction vector distinguished by the prediction candidate index in the prediction vector candidate list. The motion vector decoding part 106 decodes each motion vector of L0 and L1 by taking the sum of the prediction vector and the differential vector.

Further, if the merge index is valid, the motion vector decoding part 106 acquires the prediction information candidate list from the candidate list generating part 105, and decodes the reference indexes and the motion vectors of L0 and L1 based on the prediction information indicated by the merge index.

In step 105, the motion vector decoding part 106 stores the decoded prediction flags, the reference indexes, the information of the motion vectors of L0 and L1 in the prediction information storing part 103. These information items are used for the decoding process for the subsequent blocks.

In step 106, the prediction signal generating part 107 acquires the prediction flags, the reference indexes, the motion vectors of L0 and L1, then acquires the pixel data in a region to which the motion vectors refers from the decoded image storing part 111, and generates the prediction pixel signal.

In step 107, the inverse-quantizing part 108 acquires the orthogonal transformation coefficients decoded by the entropy decoding part 101 to perform the inverse-quantization process.

In step 108, the inverse-orthogonal transforming part 109 performs the inverse-orthogonal transformation of the inverse-quantized signal. As the result of the inverse-orthogonal transformation, the prediction error signal is generated.

It is noted that the processes of steps 102 through 106 and the processes of steps 107 and 108 can be performed in parallel and the order is arbitrary.

In step 109, the decoded pixel generating part 110 takes a sum of the prediction pixel signal and the prediction error signal to generate the decoded pixels.

In step 110, the decoded image storing part 111 stores the decoded image including the decoded pixels. Up to this point, the decoding process of the block is completed, and the process routine goes to the decoding process of the next block.

[Candidate List Generating Process]

Figure 13:
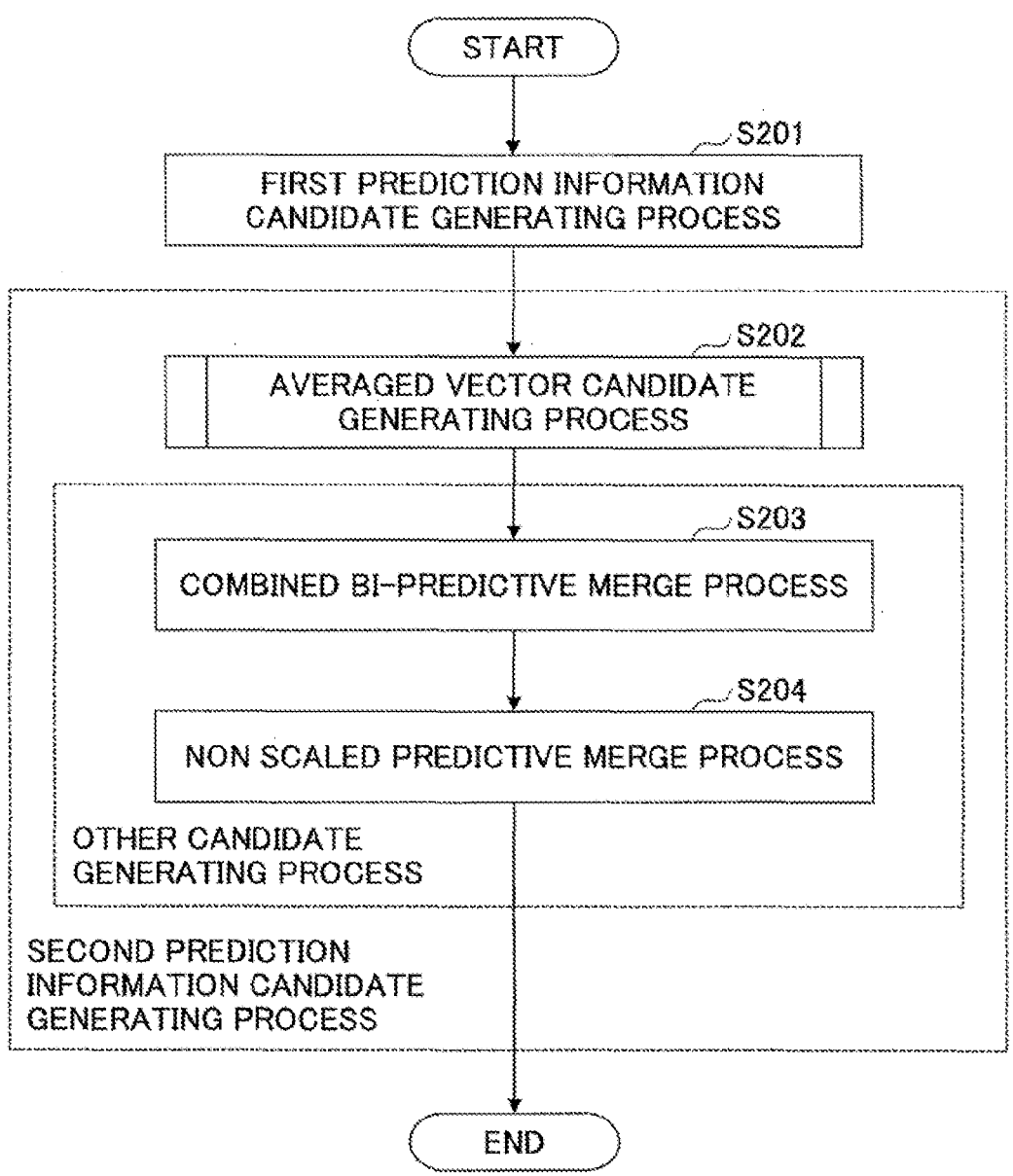
FIG. 13 is a flowchart for illustrating an example of a candidate list generating process according to the first embodiment.

Next, the operation of the candidate list generating part 105 is described. FIG. 13 is a flowchart for illustrating an example of a candidate list generating process according to the first embodiment. In step 201 illustrated in FIG. 13, the first prediction information candidate generating part 201 acquires, for example, five prediction information items which the adjacent blocks adjacent to the process block have from the prediction information storing part 103. Among the adjacent blocks, blocks which have not been processed yet, blocks which are located out of the screen, or the intra prediction block are not acquired. The first prediction information candidate generating part 201 deletes the duplicated elements in the acquired prediction information candidate list.

In steps 202 through 204, the second prediction information candidate generating part 301 generates an additional prediction information candidate if the number of the candidates of the prediction information candidate list generated by the first prediction information candidate generating part 201 is less than a predetermined number. The predetermined number is five, for example.

In step 202, the averaged candidate generating part 221 performs the process for generating the averaged vector and adds the prediction information including the averaged vector to the prediction information candidate list.

In steps 203 and 204, if the number of the prediction information candidates is less than the predetermined number even after the prediction information candidate is added by the averaged vector generating process, the second candidate generating part 311 performs another candidate generating process to add the prediction information candidate. In this example, the Combined Bi-predictive Merge is performed in step 203, and the Non Scaled Predictive Merge is performed in step 204. It is noted that, conversely, the averaged vector generating process may be performed after other candidate generating process has been performed.

[Averaged Vector Candidate Generating Process with Uni-Predictive Picture]

Figure 14:
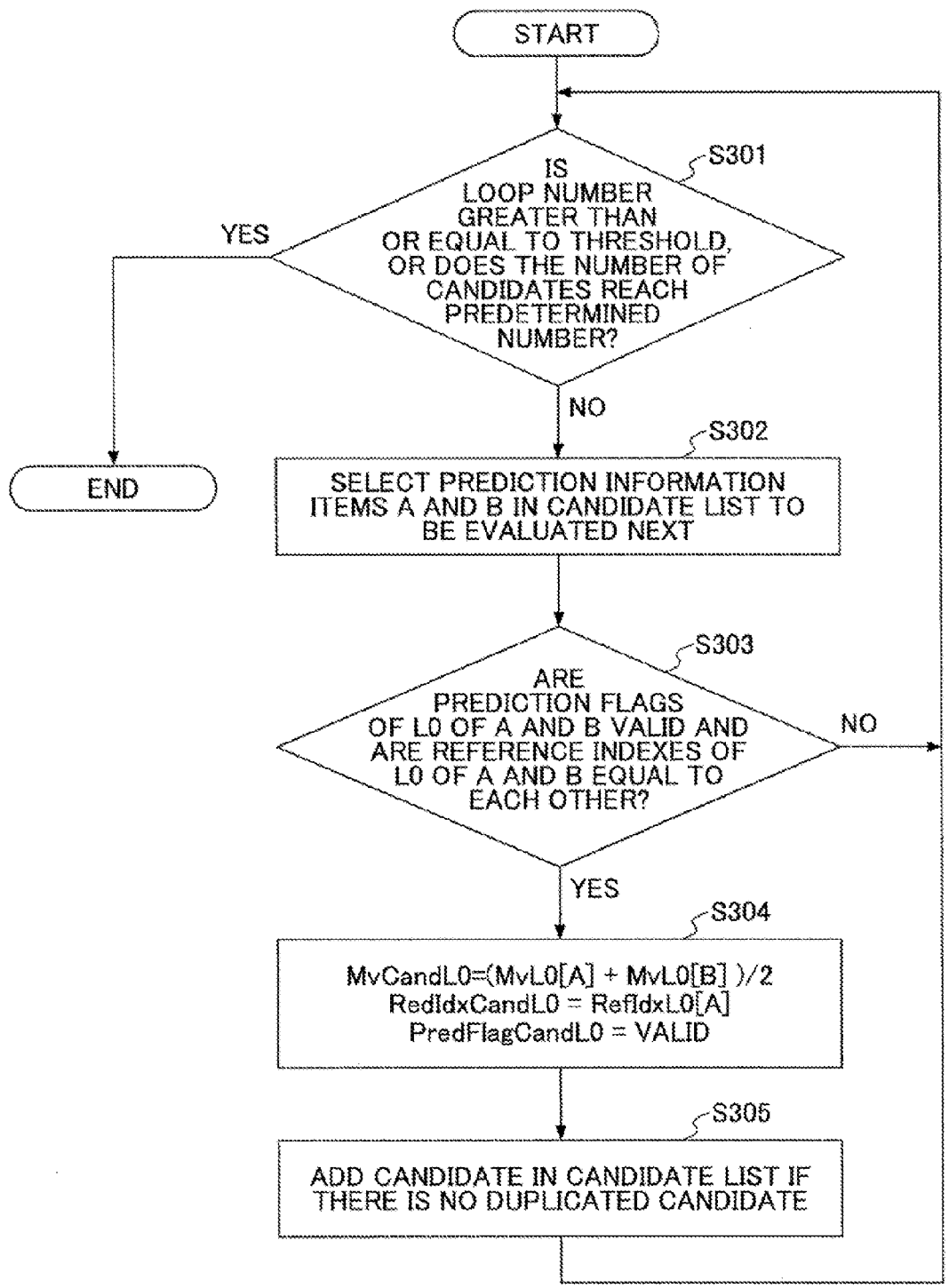
FIG. 14 is a flowchart for illustrating an example of an averaged vector candidate generating process with a uni-predictive picture according to the first embodiment.

Next, an averaged vector generating process with uni-predictive picture is described using the averaged candidate generating part 221 illustrated in FIG. 8. FIG. 14 is a flowchart for illustrating an example of an averaged vector candidate generating process with a uni-predictive picture according to the first embodiment.

In step 301, the prediction information acquiring part 401 determines whether the number of the candidates is less than the predetermined number or whether the number of repeating is greater than or equal to the predetermined repeating number. If the condition is met (Yes in step 301), the process routine is ended. On the other hand, if the condition is not met (No in step 301), the process routine goes to step 302.

In step 302, the prediction information acquiring part 401 acquires two prediction information candidates as a source of generation. The prediction information candidates may be acquired from the prediction information candidate list or the prediction information storing part 103. It is assumed that two prediction information candidates acquired by the prediction information acquiring part 401 are A and B, respectively.

In step 303, the averaged prediction information process determining part 402 determines whether the prediction flags of L0 of A and B are valid and the reference pictures of L0 of A and B are the same. If the condition is met (Yes in step 303), the process routine goes to step 304. On the other hand, if the condition is not met (No in step 303), the process routine returns to step 301.

In step 304, the averaged prediction information generating part 403 performs the averaging process of the prediction information. According to the averaging process, the averaged vector, etc., are calculated using the equations (2) and (3) or (4) and (5), etc. The averaged prediction information generating part 403 outputs the prediction information Cand including the calculated averaged vector.

In step 305, the candidate adding part 404 determines whether there is the same prediction information candidate in the prediction information candidate list as the generated prediction information Cand. If there is not the same prediction information candidate, the candidate adding part 404 adds the prediction information Cand to the prediction information candidate list. With this arrangement, it is possible to add the prediction information candidate even with the uni-predictive picture.

[Averaged Vector Candidate Generating Process with Bi-Predictive Picture]

Next, an averaged vector candidate generating process with bi-predictive picture is described using the averaged candidate generating part 221 illustrated in FIG. 10. It is noted that for the sake of the explanation, the process with the uni-predictive picture and the process with the bi-predictive picture are described separately; however, the video decoding apparatus 100 is configured to be capable of performing both processes according to a type of the picture.

Figure 15A:
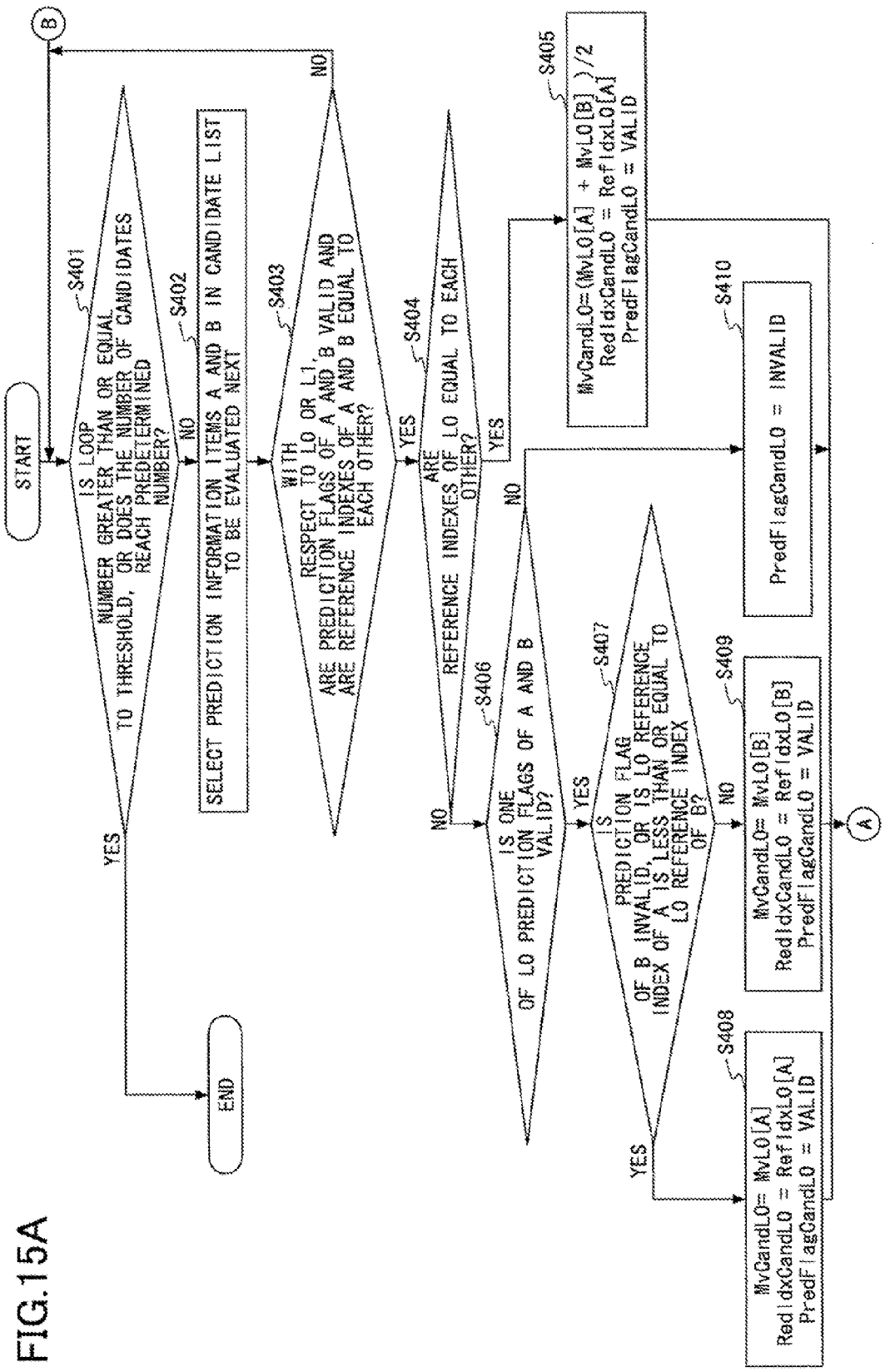
FIG. 15A is a flowchart for illustrating an example of an averaged vector candidate generating process (no. 1) with a bi-predictive picture according to the first embodiment.
Figure 15B:
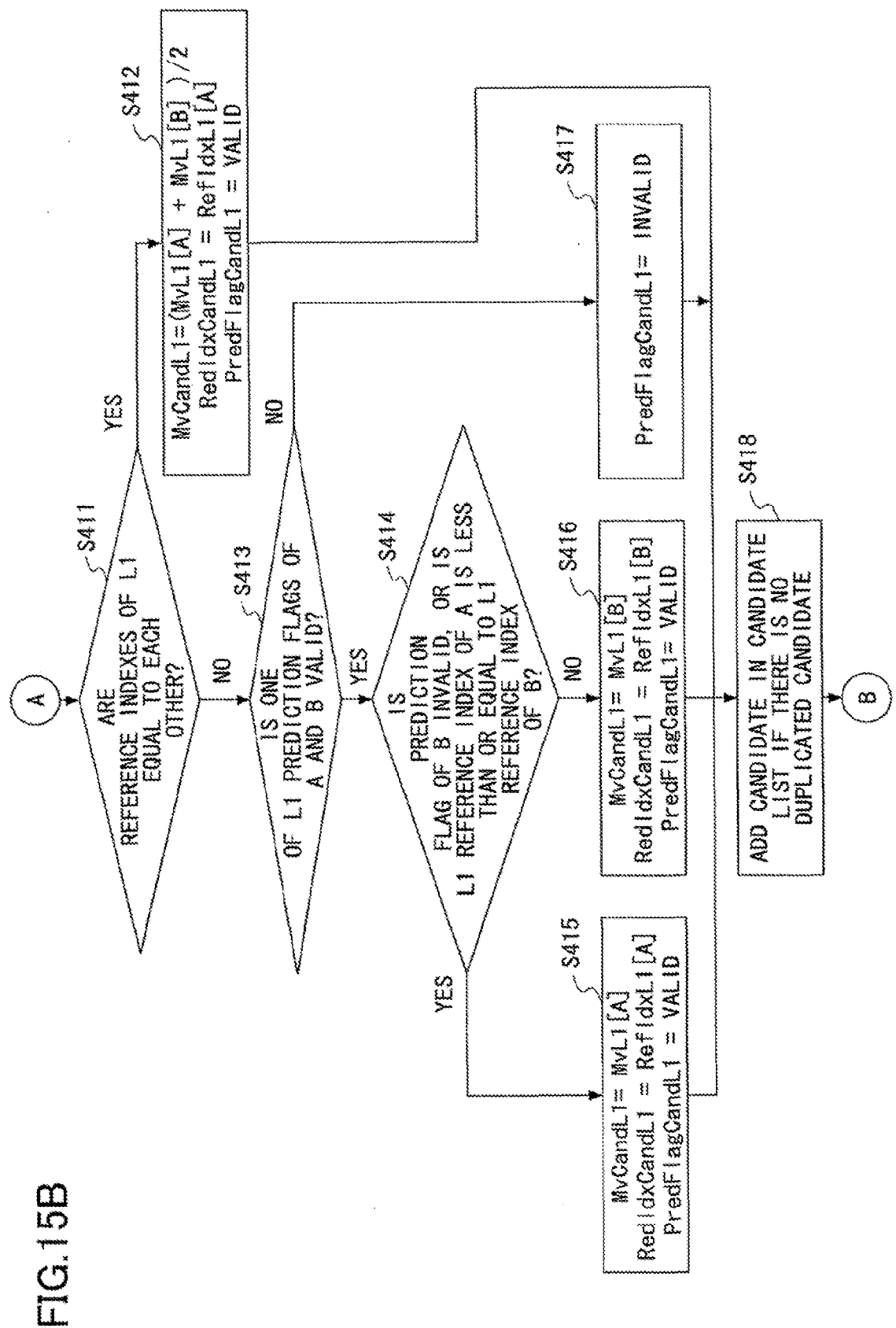
FIG. 15B is a flowchart for illustrating an example of an averaged vector candidate generating process (no. 2) with a bi-predictive picture according to the first embodiment.

FIG. 15A is a flowchart for illustrating an example of an averaged vector candidate generating process (no. 1) with the bi-predictive picture according to the first embodiment. FIG. 15B is a flowchart for illustrating an example of an averaged vector candidate generating process (no. 2) with the bi-predictive picture according to the first embodiment.

The processes of steps 401 and 402 are the same as steps 301 and 302 illustrated in FIG. 14, and thus the explanation is omitted.

In step 403, the averaged prediction information process determining part 501 determines whether the prediction flags of L0 of A and B are valid, and the reference pictures of L0 of A and B are the same, or whether the prediction flags of L1 of A and B are valid, and the reference pictures of L1 of A and B are the same. If the condition is met (Yes in step 403), the process routine goes to step 404. On the other hand, if the condition is not met (No in step 403), the process routine returns to step 401.

In step 404, the average process determining part 521 determines whether the averaging process with the motion vectors of L0 is possible by determining whether the reference indexes of L0 of A and B are the same. If the condition is met (Yes in step 404), the process routine goes to step 405. On the other hand, if the condition is not met (No in step 404), the process routine goes to step 406.

In step 405, the average processing part 522 performs the averaging process of the prediction information. The averaging process may be implemented by replacing LX of equations (6) through (9) with L0. The following is an example.

$$mvCandL0 = (mvL0[A] + MVL0[B])/2$$

$$RefIdxCandL0 = RefIdxL0[A]$$

$$PredFlagCandL0 = valid$$

In step 406, the prediction information selecting part 523 selects one of A and B which is to be information of L of the prediction information Cand. For this reason, at first, the prediction information selecting part 523 determines which of A and B has a valid prediction flag of L. If one of the prediction flags of A and B is valid (Yes in step 406), the process routine goes to step 407. On the other hand, if the prediction flags of A and B are invalid (No in step 406), the process routine goes to step 410.

In step 407, the prediction information selecting part 523 determines whether the L0 prediction flag of B is invalid or the L0 prediction flag of A is valid and the L0 reference index of A is less than or equal to the L0 reference index of B. If the condition is met (Yes in step 407), the process routine goes to step 408. On the other hand, if the condition is not met (No in step 407), the process routine goes to step 409.

In step 408, the prediction information selecting part 523 determines the prediction information of L0 as follows.

mvCandL0=mvL0[A]

RefIdxCandL0=RefIdxL0[A]

PredFlagCandL0=valid

In step 409, if the prediction flag of A is invalid or the L0 reference index of A is greater than the L0 reference index of B, the prediction information selecting part 523 determines the prediction information of L0 as follows.

mvCandL0=mvL0[B]

RefIdxCandL0=RefIdxL0[B]

PredFlagCandL0=valid

In step 410, the prediction information selecting part 523 makes the prediction flag PredFlagCandL0 of the prediction information Cand invalid.

When the process of any one of steps 405, 408 through 410 is completed, the process routine goes to step 411 illustrated in FIG. 15B.

In step 411, the average process determining part 521 determines whether the averaging process with the motion vectors of L1 is possible by determining whether the reference indexes of L1 of A and B are the same. If the condition is met (Yes in step 411), the process routine goes to step 412. On the other hand, if the condition is not met (No in step 411), the process routine goes to step 413.

In step 412, the average processing part 522 performs the averaging process of the prediction information. The averaging process may be implemented by replacing LX of equations (6) through (9) with L1. The following is an example.

mvCandL1=(mvL1[A]+mvL1[B])/2

RefIdxCandL1=RefIdxL1[A]

PredFlagCandL1=valid

In step 413, the prediction information selecting part 523 selects one of A and B which is to be information of L1 of the prediction information Cand. For this reason, at first, the prediction information selecting part 523 determines which of A and B has a valid prediction flag of L1. If one of the prediction flags of A and B is valid (Yes in step 413), the process routine goes to step 414. On the other hand, if the prediction flags of A and B are invalid (No in step 413), the process routine goes to step 417.

In step 414, the prediction information selecting part 523 determines whether the L1 prediction flag of B is invalid or the L1 prediction flag of A is valid and the L1 reference index of A is less than or equal to the L1 reference index of B. If the condition is met (Yes in step 414), the process routine goes to step 415. On the other hand, if the condition is not met (No in step 414), the process routine goes to step 416.

In step 415, the prediction information selecting part 523 determines the prediction information of L1 as follows.

mvCandL1=mvL1[A]

RefIdxCandL1=RefIdxL1[A]

PredFlagCandL1=valid

In step 416, if the prediction flag of A is invalid or the L1 reference index of A is greater than the L1 reference index of B, the prediction information selecting part 523 determines the prediction information of L1 as follows.

mvCandL1=mvL1[B]

RefIdxCandL1=RefIdxL1[B]

PredFlagCandL1=valid

In step 417, the prediction information selecting part 523 makes the prediction flag PredFlagCandL1 of the prediction information Cand invalid.

When the process of any one of steps 412, 415 through 417 is completed, the process routine goes to step 418.

In step 418, the candidate adding part 404 determines whether there is the same prediction information candidate in the prediction information candidate list as the generated prediction information Cand including PredFlagL0, RefIdxCandL0, mvCandL0, PredFlagL1, RefIdxCandL1 and mvCandL1. When the process of step 418 is completed, the process routine goes to step 401.

According to the processes described above, it is possible to add an appropriate averaged vector to the prediction information candidate list even in the case of the uni-predictive picture and the bi-predictive picture.

According to the first embodiment, it is possible to further improve the coding efficiency in the case where the number of the prediction information candidates of the merge mode is fixed.

Second Embodiment

In the following, a video coding apparatus according to a second embodiment is described. The video coding apparatus according to a second embodiment includes the candidate list generating part according to the second embodiment.

[Configuration]

Figure 16:
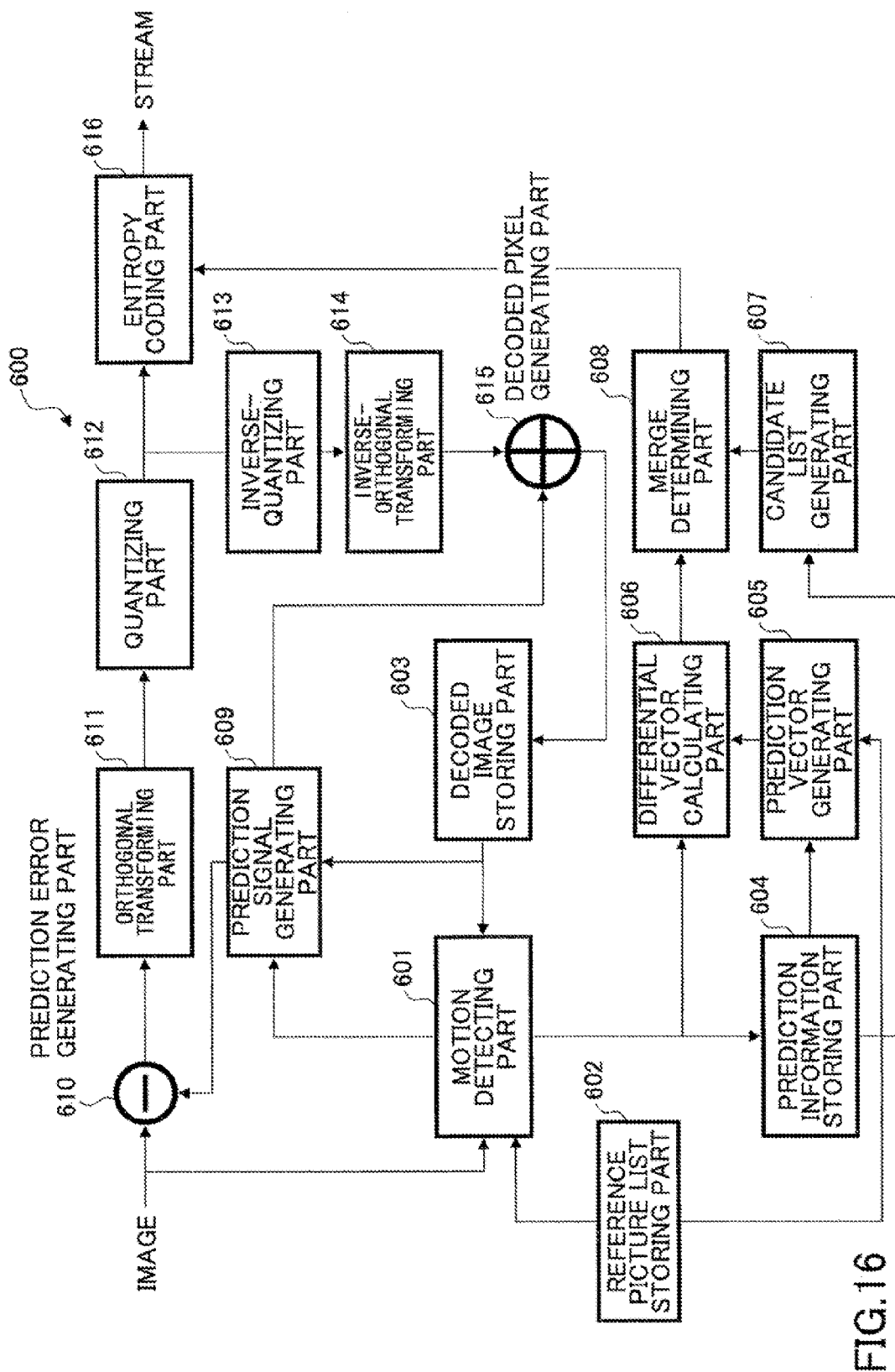
FIG. 16 is a block diagram of an example of a configuration of a video coding apparatus according to the second embodiment.

FIG. 16 is a diagram for illustrating an example of a configuration of a video coding apparatus 600 according to the second embodiment. The video coding apparatus 600 illustrated in FIG. 16 includes a motion detecting part 601, a reference picture list storing part 602, a decoded image storing part 603, a prediction information storing part 604, a prediction vector generating part 605, a differential vector calculating part 606, a candidate list generating part 607 and a merge determining part 608.

Further, the video coding apparatus 600 includes a prediction signal generating part 609, a prediction error generating part 610, an orthogonal transforming part 611, a quantizing part 612, an inverse-quantizing part 613, an inverse-orthogonal transforming part 614, a decoded pixel generating part 615 and an entropy coding part 616.

The motion detecting part 601 acquires an original image, acquires the stored location of the reference picture from the reference picture list storing part 602, and acquires image data of the reference picture from the decoded image storing part 603. The motion detecting part 601 detects the prediction flags and the reference indexes of L0 and L1. The motion detecting part 601 outputs the region location information of the reference image to which the detected motion vector refers.

The reference picture list storing part 602 stores the stored locations of the reference pictures and picture information including POC of referable pictures for the process block.

The decoded image storing part 603 stores the pictures which were subject to the coding process and the local decoding process in the video coding apparatus in order to utilize them as reference pictures for motion compensation.

The prediction information storing part 604 stores motion vector information which includes the motion vectors detected by the motion detecting part 601 and the prediction flags and the reference index information of L0 and L1. For example, the prediction information storing part 604 stores motion vector information including motion vectors of blocks which are adjacent to the process block in a spatial direction or a time direction and reference picture identifiers which indicate the pictures to which the motion vectors refer to.

The prediction vector generating part 605 generates the prediction vector candidate lists of L0 and L1 using the prediction flags and reference indexes of L0 and L1. The process for generating the prediction vector candidate may be the same as known processes such as HEVC disclosed in non-Patent Document 2, for example.

The differential vector calculating part 606 acquires the motion vectors L0 and L1 from the motion detecting part 601, acquires the prediction flags, the reference indexes of L0 and L1 and the prediction vector candidate lists from the prediction vector generating part 605, and calculates the respective differential vectors.

For example, the differential vector calculating part 606 selects the prediction vectors, among the prediction vector candidate lists, which are the most similar to the motion vectors of L0 and L1, and determines the prediction vectors and prediction vector candidate indexes, respectively, if the prediction flags of L0 and L1 are valid.

Further, the differential vector calculating part 606 generates the differential vector of L0 by subtracting the prediction vector of L0 from the motion vector of L0, and generates the differential vector of L1 by subtracting the prediction vector of L1 from the motion vector of L1.

The candidate list generating part 607 generates the prediction information candidate list as is the case with the first embodiment, and outputs the generated prediction information candidate list to the merge determining part 608.

The merge determining part 608 acquires the reference indexes, the motion vectors, the differential vectors of L0 and L1, etc., from the differential vector calculating part 606, and acquires the prediction information candidate list from the candidate list generating part 607. The merge determining part 608 makes the merge flag valid and makes the indexes in the prediction information candidate list be merge indexes if the prediction information including the reference indexes and the motion vectors exists in the prediction information candidate list. The merge determining part 608 outputs the merge flag which indicates whether the merge is valid or invalid and the merge indexes to the entropy coding part 616.

The merge determining part 608 makes the merge flag invalid and outputs the reference indexes, the differential vectors, and the prediction candidate indexes of L0 and L1 acquired from the differential vector calculating part 606 to the entropy coding part 616, if the prediction information including the reference indexes and the motion vectors does not exist in the prediction information candidate list.

The prediction signal generating part 609 acquires the reference pixels from the decoded image storing part 603 based on the region location information of the input reference image and generates a prediction pixel signal.

The prediction error generating part 610 acquires the original image and the prediction pixel signal and calculates the differential between the original image and the prediction pixel signal to generate a prediction error signal.

The orthogonal transforming part 611 performs the orthogonal transformation of the prediction error signal such as a discrete cosine transformation, and outputs the orthogonal transformation coefficients to the quantizing part 612. The quantizing part 612 quantizes the orthogonal transformation coefficients.

The inverse-quantizing part 613 performs the inverse-quantization of the quantized orthogonal transformation coefficients. The inverse-orthogonal transforming part 614 performs the inverse-orthogonal transformation of the inverse-quantized coefficients.

The decoded pixel generating part 615 takes a sum of the prediction pixel signal and the prediction error signal. The decoded image including the decoded pixels is stored in the decoded image storing part 603.

The entropy coding part 616 performs the entropy coding of the input data including the merge flag, the merge indexes, the L0 reference index, the L0 differential vector, the L0 prediction vector candidate index, the L1 differential vector, the L1 prediction vector candidate index and the quantized orthogonal transformation coefficients and outputs it as stream data.

With respect to a coding method of parameters related to the inter prediction mode, at first, the entropy coding part 616 codes the merge flag and codes the merge index if the merge flag is valid.

The entropy coding part 616 codes the prediction flag information of L0 and L1 without coding the merge index if the merge flag is invalid. Further, the entropy coding part 616 codes the L0 reference index, the L0 differential vector and the L0 prediction vector candidate index if the prediction flag of L0 is valid, and codes the L1 reference index, the L1 differential vector and the L1 prediction vector candidate index if the prediction flag of L1 is valid.

[Operations]

Figure 17:
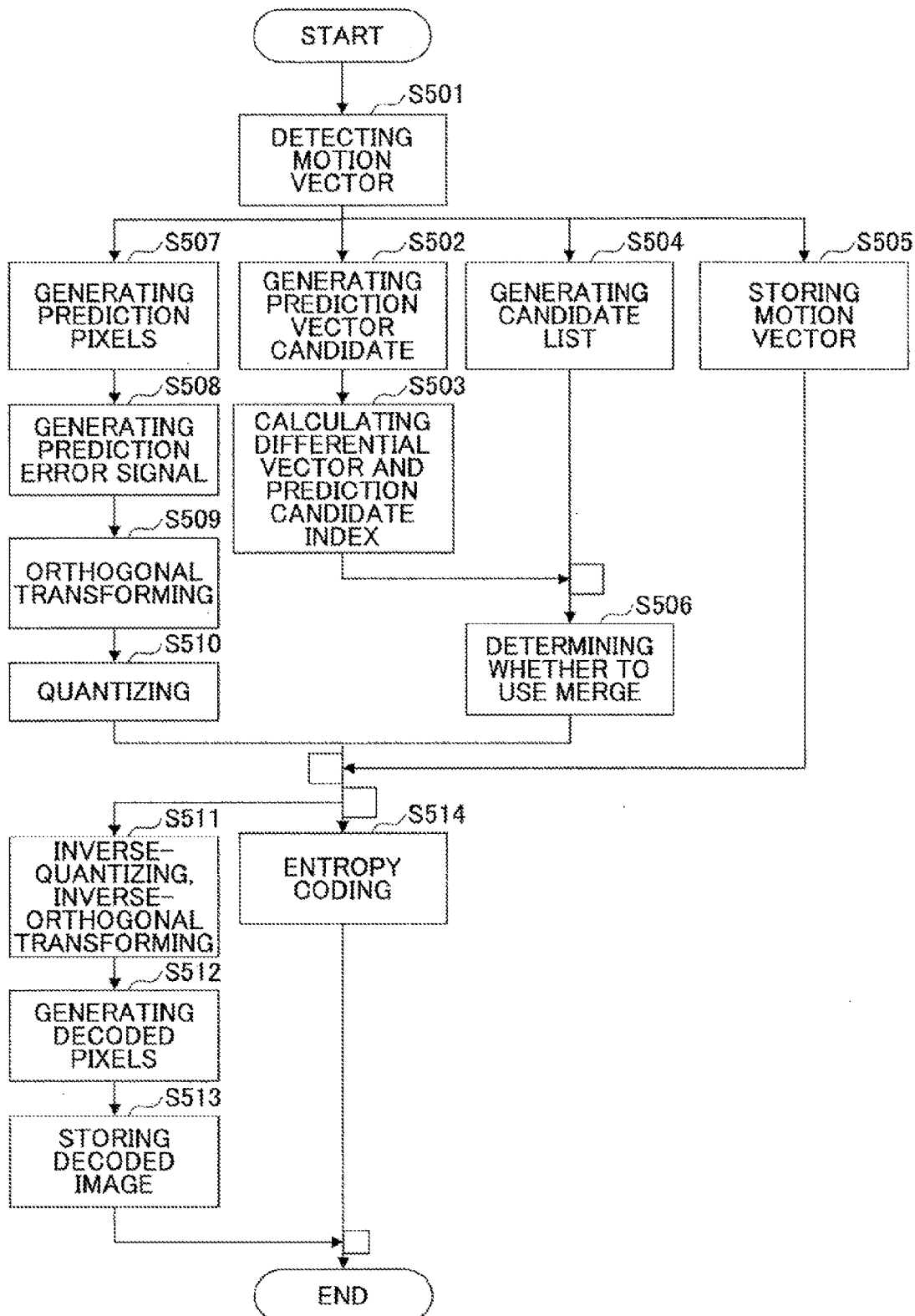
FIG. 17 is a flowchart for illustrating an example of a process of the video coding apparatus according to the second embodiment.

In the following, operations of the video coding apparatus 600 according to the second embodiment are described. FIG. 17 is a flowchart for illustrating an example of a process of the video coding apparatus according to the second embodiment.

In step 501, the motion detecting part 601 acquires the original image, acquires the image data of the reference picture, and detects the prediction flags, the reference indexes and the motion vectors of L0 and L1.

In step 502, the prediction vector generating part 605 calculates the prediction vector candidate lists of L0 and L1, respectively. At that time, the prediction vector generating part 605 may use the prediction vector generating process disclosed in non-Patent Document 2, for example.

In step 503, the differential vector calculating part 606 selects the prediction vectors, among the prediction vector candidate list, which are the most similar to the motion vectors of L0 and L1, and determines the prediction vectors and prediction candidate indexes, respectively, if the prediction flags of L0 and L1 are valid.

Further, the differential vector calculating part 606 generates the differential vector of L0 by subtracting the prediction vector of L0 from the motion vector of L0, and generates the differential vector of L1 by subtracting the prediction vector of L1 from the motion vector of L1.

In step 504, as is described above, the candidate list generating part 607 determines that the averaged vector can be added, generates the prediction information candidate list, and outputs the generated prediction information candidate list to the merge determining part 608.

In step 505, the prediction information storing part 604 stores the motion vector information which includes the prediction flags output from by the motion detecting part 601, the reference index information and the motion vectors of L0 and L1. These information items are utilized for coding the next block.

In step 506, the merge determining part 608 determines whether the merge flag is valid or invalid, as described above. The merge determining part 608 outputs the merge flag and the merge indexes to the entropy coding part 616, if it determines that the merge flag is valid. The merge determining part 608 outputs the merge flag, the prediction flags, the reference indexes, the differential vectors, the prediction candidate indexes of L0 and L1 to the entropy coding part 616, if it determines that the merge flag is invalid.

In step 507, the prediction signal generating part 609 acquires the reference pixels from the decoded image storing part 603 based on the region location information of the input reference image and generates the prediction pixel signal.

In step 508, the prediction error generating part 610 receives the input of the original image and the prediction pixel signal and calculates the differential between the original image and the prediction pixel signal to generate a prediction error signal.

In step 509, the orthogonal transforming part 611 performs the orthogonal transformation of the prediction error signal to generate the orthogonal transformation coefficients.

In step 510, the quantizing part 612 quantizes the orthogonal transformation coefficients to generate the quantized orthogonal transformation coefficients.

It is noted that the respective processes of steps 502 through 503, 504, 505, and 507 through 510 can be performed in parallel and the order is arbitrary.

In step 511, the inverse-quantizing part 613 performs the inverse-quantization of the quantized orthogonal transformation coefficients to generate the orthogonal transformation coefficients. The inverse-orthogonal transforming part 614 performs the inverse-orthogonal transformation of the orthogonal transformation coefficients to generate the prediction error signal.

In step 512, the decoded pixel generating part 615 takes a sum of the prediction pixel signal and the prediction error signal to generate the decoded pixels.

In step 513, the decoded image storing part 603 stores the decoded image including the decoded pixels. The decoded image is used for the decoding process for the subsequent blocks.

In step 514, the entropy coding part 616 performs the entropy coding of the respective information items according to the status of the merge flag and outputs the coded data as a stream.

According to the second embodiment described above, it is possible to further improve the coding efficiency in the case where the number of the prediction information candidates of the merge mode is fixed. It is noted that with respect to the candidate list generating part 607 of the video coding apparatus 600, it is clear for those skilled in the art that the candidate list generating part 105 according to the first embodiment may be used.

[Variation]

Figure 18:
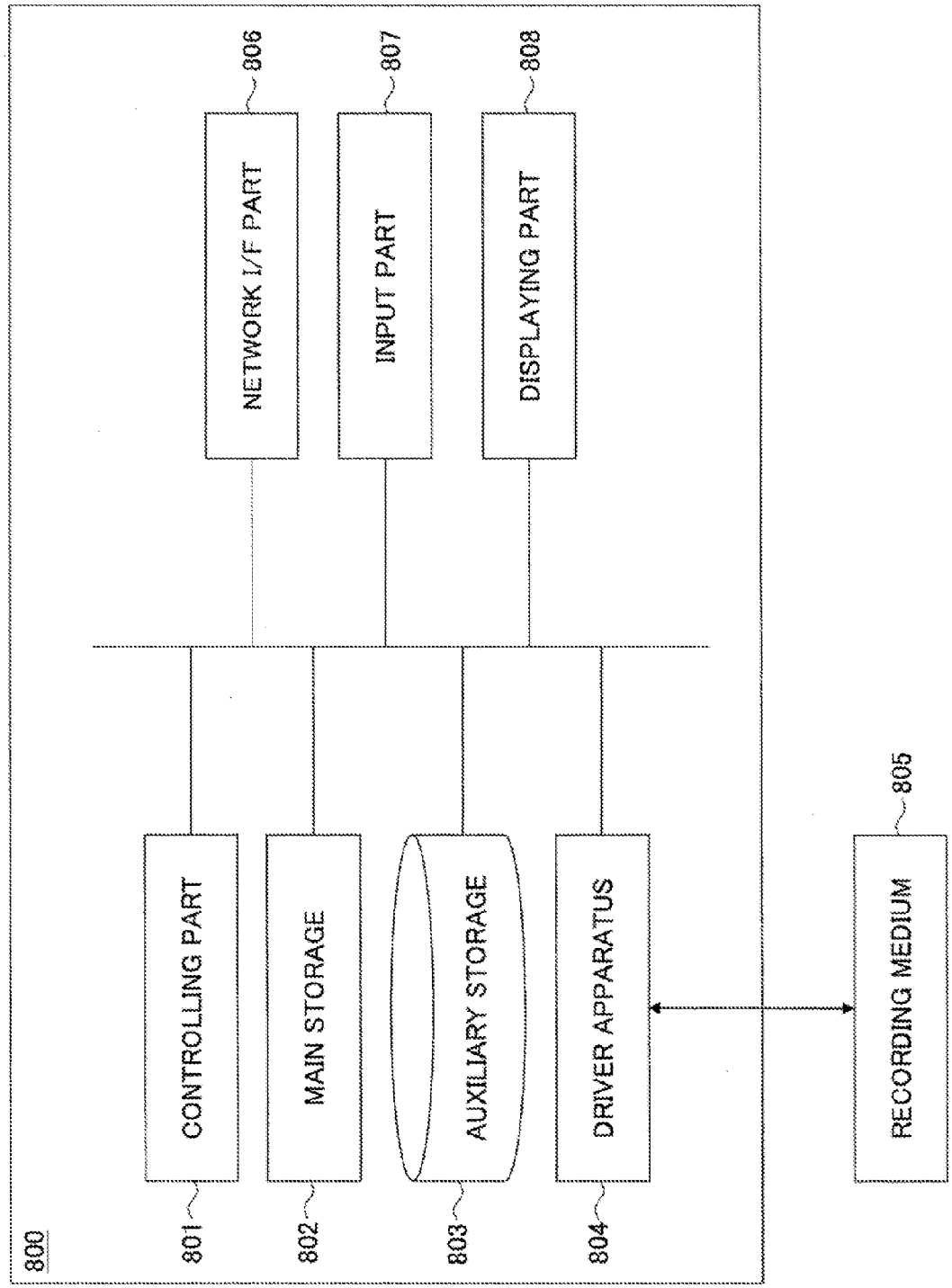
FIG. 18 is a block diagram of an example of a configuration of an image processing apparatus according to the third embodiment.

FIG. 18 is a block diagram of an example of a configuration of an image processing apparatus 800. The image processing apparatus 800 is one example of the video decoding apparatus or the video coding apparatus according to the embodiments described above. As illustrated in FIG. 18, the image processing apparatus 800 includes a controlling part 801, a main storage 802, an auxiliary storage 803, a driver apparatus 804, a network I/F part 806, an input part 807 and a displaying part 808. These parts are connected via a bus such that data can be received and transmitted between them.

The controlling part 801 is a CPU which controls the respective apparatuses, and performs calculations and processing of data in the image processing apparatus 800. Further, the controlling part 801 is an arithmetical unit which executes programs stored in the main storage 802 or the auxiliary storage 803. The controlling part 801 receives the data from the input part 807 or the storage and outputs to the displaying part 808 or the storage after performing the calculation or processing.

The main storage 802 is a ROM (Read Only Memory), a RAM (Random Access Memory) or the like. The main storage 802 stores or temporarily store programs such as an OS, which is fundamental software the controlling part 801 executes, or application software or data.

The auxiliary storage 803 is a HDD (Hard Disk Drive) or the like. The auxiliary storage 803 stores data related to the application software, etc.

The driver apparatus 804 reads the programs from a recording medium 805, for example, a flexible disk, and installs the programs in the storage.

Further, the recording medium 805 stores a predetermined program. The program stored in the recording medium 805 is installed in the image processing apparatus 800 via the driver apparatus 804. The installed program can be executed by the image processing apparatus 800.

The network I/F part 806 is an interface between peripherals, which is connected via a network constructed by wired and/or wireless transmission lines such as LAN (Local Area Network), WAN (Wide Area Network), and the image processing apparatus 800.

The input part 807 includes a keyboard including cursor keys, numeral input keys, various functional keys, etc., and a mouse, a track pad or the like for performing selection of keys, etc., on a display screen of the displaying part 808. Further, the input part 807 is a user interface for a user to give operating instructions to the controlling part 801 and input data.

The displaying part 808 includes an LCD (Liquid Crystal Display) or the like. The display on the displaying part 808 is generated based on the display data input from the controlling part 801. It is noted that the displaying part 808 may be provided at an external position. In this case, the image processing apparatus 800 has a display controlling part.

In this way, the video coding process or the video decoding process according to the embodiments described above may be implemented as a program to be executed by the image processing apparatus 800. The video coding process or the video decoding process can be implemented by installing the program from a server or the like and causing the image processing apparatus 800 to execute the program.

Further, the video coding process or the video decoding process can be implemented by recording a video coding program or a video decoding program on the recording medium 805 and causing the image processing apparatus 800 or a mobile terminal to read the program stored in the recording medium 805.

It is noted that the recording medium 805 may be of various types, including a recording medium for optically, electrically or magnetically storing information, such as a CD-ROM, a flexible disk, a magneto-optical disk; and a semiconductor memory for electrically storing information, such as a ROM, a flash memory, etc. It is noted that carrier waves are not included in the recording medium 805.

The programs executed by the image processing apparatus 800 have modular configurations including the parts described above with reference to the embodiments. As for actual hardware, one or more program parts are loaded in the main storage 802 from the auxiliary storage 803 and held in the main storage 80 when the controlling part 801 reads the programs and executes them.

Further, the video coding process or the video decoding process described above with reference to the embodiments may be installed in one or more integrated circuits.

All examples and conditional language provided herein are intended for pedagogical purposes of aiming the reader in understanding the invention and the concepts contributed by the inventor to further the art, and are not to be construed as limitation to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

The invention claimed is:

1. A video decoding apparatus that performs a decoding process, on a process block basis, using a motion vector of the process block and prediction information candidates of the motion vector, the video decoding apparatus comprising:
   a prediction information storing part configured to store prediction information including motion vectors of adjacent blocks and reference picture identifiers, the adjacent blocks being adjacent to the process block in a spatial direction or a time direction, the reference picture identifiers indicating pictures that the motion vectors refer to;
   a first prediction information candidate generating part configured to acquire the prediction information of the adjacent block from the prediction information storing part and generate the prediction information candidates if motion compensation of the process block is performed using the same prediction information as the prediction information of the adjacent block; and
   a second prediction information candidate generating part configured to
   average two motion vectors included in two prediction information items among the prediction information candidates if the reference picture identifiers of the two prediction information items indicate a same picture,
   generate prediction information including the averaged motion vector of the two prediction information items, and
   add the generated prediction information to the prediction information candidates if the number of the prediction information candidates is less than a predetermined number,
   wherein the second prediction information candidate generating part includes
   a prediction information acquiring part configured to acquire two prediction information items of the prediction information candidates, and
   a first process determining part configured to determine whether the reference picture identifiers of these two prediction information items indicate the same picture,
   wherein the prediction information includes, if there are first and second lists for the referring picture, two sets of the motion vector and the reference picture identifier corresponding to the respective lists,
   the first process determining part determines that an averaging process of the prediction information is to be performed, if the reference picture identifiers of the first or second lists of these two prediction information items are effective and the effective reference picture identifiers indicate the same picture, and
   the second prediction information candidate generating part includes
   a second process determining part configured to determine, for each of the first and second lists, whether the reference picture identifiers of these two prediction information items indicate the same picture,
   an average processing part configured to generate, if it is determined by the second process determining part that the reference picture identifiers of a predetermined list indicate the same picture, prediction information of the predetermined list that includes the averaged vector of these two motion vectors of the predetermined list, and
   a prediction information selecting part configured to select one of these two sets of the motion vector and the reference picture identifier to generate prediction information of the predetermined list, if it is determined by the second process determining part that the reference picture identifiers of the predetermined list don't indicate the same picture.

2. The video decoding apparatus of claim 1, wherein the prediction information selecting part selects a motion vector and a reference picture identifier based on magnitude of the reference picture identifiers.

3. The video decoding apparatus of claim 1, wherein the prediction information selecting part selects a motion vector and a reference picture identifier based on display times of the picture indicated by the reference picture identifiers.

4. A video coding apparatus that performs a coding process, on a process block basis, using a motion vector of the process block and prediction information candidates of the motion vector, the process blocks being generated by dividing an input image, the video coding apparatus comprising:
   a prediction information storing part configured to store prediction information including motion vectors of adjacent blocks and reference picture identifiers, the adjacent blocks being adjacent to the process block in a spatial direction or a time direction, the reference picture identifiers indicating pictures that the motion vectors refer to;
   a first prediction information candidate generating part configured to acquire the prediction information of the adjacent block from the prediction information storing part and generate the prediction information candidates if motion compensation of the process block is performed using the same prediction information as the prediction information of the adjacent block; and
   a second prediction information candidate generating part configured to
   average two motion vectors included in two prediction information items among the prediction information candidates if the reference picture identifiers of the two prediction information items indicate a same picture,
   generate prediction information including the averaged motion vector of the two prediction information items, and
   add the generated prediction information to the prediction information candidates if the number of the prediction information candidates is less than a predetermined number,
   wherein the generating the prediction information includes
   acquiring two prediction information items of the prediction information candidates, and
   determining whether the reference picture identifiers of these two prediction information items indicate the same picture,
   wherein the prediction information includes, if there are first and second lists for the referring picture, two sets of the motion vector and the reference picture identifier corresponding to the respective lists, the determining includes determining that an averaging process of the prediction information is to be performed, if the reference picture identifiers of the first or second lists of these two prediction information items are effective and the effective reference picture identifiers indicate the same picture, and the generating the prediction information includes determining, for each of the first and second lists, whether the reference picture identifiers of these two prediction information items indicate the same picture, generating, if it is determined that the reference picture identifiers of a predetermined list indicate the same picture, prediction information of the predetermined list that includes the averaged vector of these two motion vectors of the predetermined list, and selecting one of these two sets of the motion vector and the reference picture identifier to generate prediction information of the predetermined list, if it is determined that the reference picture identifiers of the predetermined list don't indicate the same picture.

5. A video decoding method to be executed by a video decoding apparatus that performs a decoding process, on a process block basis, using a motion vector of the process block and prediction information candidates of the motion vector, the video decoding method comprising:

acquiring prediction information of an adjacent block from a prediction information storing part, which stores the prediction information of the adjacent block;

generating the prediction information candidates if motion compensation of the process block is performed using the same prediction information as the prediction information of the adjacent block, the prediction information including the motion vector of the adjacent block and a reference picture identifier, the adjacent block being adjacent to the process block in a spatial direction or a time direction, the reference picture identifier indicating a picture that the motion vector refers to;

averaging two motion vectors included in two prediction information items among the prediction information candidates if the reference picture identifiers of the two prediction information items indicate a same picture;

generating prediction information including the averaged motion vector of the two prediction information items; and adding the generated prediction information to the prediction information candidates if the number of the prediction information candidates is less than a predetermined number, wherein the generating the prediction information includes acquiring two prediction information items of the prediction information candidates, and determining whether the reference picture identifiers of these two prediction information items indicate the same picture, wherein the prediction information includes, if there are first and second lists for the referring picture, two sets of the motion vector and the reference picture identifier corresponding to the respective lists, the determining includes determining that an averaging process of the prediction information is to be performed, if the reference picture identifiers of the first or second lists of these two prediction information items are effective and the effective reference picture identifiers indicate the same picture, and the generating the prediction information includes determining, for each of the first and second lists, whether the reference picture identifiers of these two prediction information items indicate the same picture, generating, if it is determined that the reference picture identifiers of a predetermined list indicate the same picture, prediction information of the predetermined list that includes the averaged vector of these two motion vectors of the predetermined list, and selecting one of these two sets of the motion vector and the reference picture identifier to generate prediction information of the predetermined list, if it is determined that the reference picture identifiers of the predetermined list don't indicate the same picture.

6. A video coding method to be executed by a video coding apparatus that performs an coding process, on a process block basis, using a motion vector of the process block and prediction information candidates of the motion vector, the process blocks being generated by dividing an input image, the video coding method comprising:

acquiring prediction information of an adjacent block from a prediction information storing part, which stores the prediction information of the adjacent block;

generating the prediction information candidates if motion compensation of the process block is performed using the same prediction information as the prediction information of the adjacent block, the prediction information including the motion vector of the adjacent block and a reference picture identifier, the adjacent block being adjacent to the process block in a spatial direction or a time direction, the reference picture identifier indicating a picture that the motion vector refers to;

averaging two motion vectors included in two prediction information items among the prediction information candidates if the reference picture identifiers of the two prediction information items indicate a same picture;

generating prediction information including the averaged motion vector of the two prediction information items; and adding the generated prediction information to the prediction information candidates if the number of the prediction information candidates is less than a predetermined number, wherein the generating the prediction information includes acquiring two prediction information items of the prediction information candidates, and determining whether the reference picture identifiers of these two prediction information items indicate the same picture, wherein the prediction information includes, if there are first and second lists for the referring picture, two sets of the motion vector and the reference picture identifier corresponding to the respective lists, the determining includes determining that an averaging process of the prediction information is to be performed, if the reference picture identifiers of the first or second lists of these two prediction information items are effective and the effective reference picture identifiers indicate the same picture, and the generating the prediction information includes determining, for each of the first and second lists, whether the reference picture identifiers of these two prediction information items indicate the same picture, generating, if it is determined that the reference picture identifiers of a predetermined list indicate the same picture, prediction information of the predetermined list that includes the averaged vector of these two motion vectors of the predetermined list, and selecting one of these two sets of the motion vector and the reference picture identifier to generate prediction information of the predetermined list, if it is determined that the reference picture identifiers of the predetermined list don't indicate the same picture.

7. A non-transitory computer-readable recoding medium having stored therein a video decoding program for causing a computer to execute a decoding process, on a process block basis, using a motion vector of the process block and prediction information candidates of the motion vector, the decoding process comprising:

acquiring prediction information of an adjacent block from a prediction information storing part, which stores the prediction information of the adjacent block;

generating the prediction information candidates if motion compensation of the process block is performed using the same prediction information as the prediction information of the adjacent block, the prediction information including the motion vector of the adjacent block and a reference picture identifier, the adjacent block being adjacent to the process block in a spatial direction or a time direction, the reference picture identifier indicating a picture that the motion vector refers to;

averaging two motion vectors included in two prediction information items among the prediction information candidates if the reference picture identifiers of the two prediction information items indicate a same picture;

generating prediction information including the averaged motion vector of the two prediction information items; and adding the generated prediction information to the prediction information candidates if the number of the prediction information candidates is less than a predetermined number, wherein the generating the prediction information includes acquiring two prediction information items of the prediction information candidates, and determining whether the reference picture identifiers of these two prediction information items indicate the same picture, wherein the prediction information includes, if there are first and second lists for the referring picture, two sets of the motion vector and the reference picture identifier corresponding to the respective lists, the determining includes determining that an averaging process of the prediction information is to be performed, if the reference picture identifiers of the first or second lists of these two prediction information items are effective and the effective reference picture identifiers indicate the same picture, and the generating the prediction information includes determining, for each of the first and second lists, whether the reference picture identifiers of these two prediction information items indicate the same picture, generating, if it is determined that the reference picture identifiers of a predetermined list indicate the same picture, prediction information of the predetermined list that includes the averaged vector of these two motion vectors of the predetermined list, and selecting one of these two sets of the motion vector and the reference picture identifier to generate prediction information of the predetermined list, if it is determined that the reference picture identifiers of the predetermined list don't indicate the same picture.

8. A non-transitory computer-readable recoding medium having stored therein a video coding program for causing a computer to execute a coding process, on a process block basis, using a motion vector of the process block and prediction information candidates of the motion vector, the process blocks being generated by dividing an input image, the coding process comprising:

acquiring prediction information of an adjacent block from a prediction information storing part, which stores the prediction information of the adjacent block;

generating the prediction information candidates if motion compensation of the process block is performed using the same prediction information as the prediction information of the adjacent block, the prediction information including the motion vector of the adjacent block and a reference picture identifier, the adjacent block being adjacent to the process block in a spatial direction or a time direction, the reference picture identifier indicating a picture that the motion vector refers to;

averaging two motion vectors included in two prediction information items among the prediction information candidates if the reference picture identifiers of the two prediction information items indicate a same picture;

generating prediction information including the averaged motion vector of the two prediction information items; and adding the generated prediction information to the prediction information candidates if the number of the prediction information candidates is less than a predetermined number, wherein the generating the prediction information includes acquiring two prediction information items of the prediction information candidates, and determining whether the reference picture identifiers of these two prediction information items indicate the same picture, wherein the prediction information includes, if there are first and second lists for the referring picture, two sets of the motion vector and the reference picture identifier corresponding to the respective lists, the determining includes determining that an averaging process of the prediction information is to be performed, if the reference picture identifiers of the first or second lists of these two prediction information items are effective and the effective reference picture identifiers indicate the same picture, and the generating the prediction information includes determining, for each of the first and second lists, whether the reference picture identifiers of these two prediction information items indicate the same picture, generating, if it is determined that the reference picture identifiers of a predetermined list indicate the same picture, prediction information of the predetermined list that includes the averaged vector of these two motion vectors of the predetermined list, and selecting one of these two sets of the motion vector and the reference picture identifier to generate prediction information of the predetermined list, if it is determined that the reference picture identifiers of the predetermined list don't indicate the same picture.

* * * * *